(12) United States Patent
Sather et al.

(10) Patent No.: US 11,847,568 B2
(45) Date of Patent: Dec. 19, 2023

(54) QUANTIZING NEURAL NETWORKS USING SHIFTING AND SCALING

(71) Applicant: Perceive Corporation, San Jose, CA (US)

(72) Inventors: Eric A. Sather, Palo Alto, CA (US); Steven L. Teig, Menlo Park, CA (US)

(73) Assignee: PERCEIVE CORPORATION, San Jose, CA (US)

( * ) Notice: Subject to any disclaimer, the term of this patent is extended or adjusted under 35 U.S.C. 154(b) by 957 days.

(21) Appl. No.: 16/596,177

(22) Filed: Oct. 8, 2019

(65) Prior Publication Data

US 2021/0034982 A1 Feb. 4, 2021

Related U.S. Application Data

(60) Provisional application No. 62/880,475, filed on Jul. 30, 2019.

(51) Int. Cl.
*G06N 3/08* (2023.01)
*G06N 3/084* (2023.01)
(Continued)

(52) U.S. Cl.
CPC ........... *G06N 3/084* (2013.01); *G06F 5/012* (2013.01); *G06F 7/483* (2013.01); *G06N 3/048* (2023.01);
(Continued)

(58) Field of Classification Search
CPC ......... G06F 5/012; G06F 7/483; G06N 20/00; G06N 3/0445; G06N 3/0454;
(Continued)

(56) References Cited

U.S. PATENT DOCUMENTS 11,468,313 B1 10/2022 Naumov et al.
11,494,657 B2 11/2022 Sather et al.
(Continued)

OTHER PUBLICATIONS

Chen et al., "Deep Neural Network Quantization via Layer-Wise Optimization Using Limited Training Data", Jul. 7, 2019, The Thirty-Third AAAI Conference on Artificial Intelligence (AAAI-19), vol. 33 No. 01: AAAI-19, IAAI-19, EAAI-20, pp. 3329-3336. (Year: 2019).*

(Continued)

*Primary Examiner* — Brent Johnston Hoover
(74) *Attorney, Agent, or Firm* — ADELI LLP

(57) ABSTRACT

Some embodiments of the invention provide a novel method for training a quantized machine-trained network. Some embodiments provide a method of scaling a feature map of a pre-trained floating-point neural network in order to match the range of output values provided by quantized activations in a quantized neural network. A quantization function is modified, in some embodiments, to be differentiable to fix the mismatch between the loss function computed in forward propagation and the loss gradient used in backward propagation. Variational information bottleneck, in some embodiments, is incorporated to train the network to be insensitive to multiplicative noise applied to each channel. In some embodiments, channels that finish training with large noise, for example, exceeding 100%, are pruned.

20 Claims, 8 Drawing Sheets

(51) Int. Cl.
G06N 3/082 (2023.01)
G06F 7/483 (2006.01)
G06N 5/046 (2023.01)
G06N 20/00 (2019.01)
G06N 3/063 (2023.01)
G06F 5/01 (2006.01)
G06N 3/048 (2023.01)

(52) U.S. Cl.
CPC ............ G06N 3/063 (2013.01); G06N 3/082 (2013.01); G06N 5/046 (2013.01); G06N 20/00 (2019.01)

(58) Field of Classification Search
CPC .... G06N 3/0472; G06N 3/0481; G06N 3/063; G06N 3/082; G06N 3/084; G06N 5/003; G06N 5/046; G06N 7/005; G06N 3/044; G06N 3/045; G06N 3/047; G06N 3/048; G06N 5/01; G06N 7/01
See application file for complete search history.

(56) References Cited

U.S. PATENT DOCUMENTS

| | | | |
|---|---|---|---|
| 2007/0060186 | A1 | 3/2007 | Ganesan et al. |
| 2016/0086078 | A1 | 3/2016 | Ji et al. |
| 2016/0328643 | A1 | 11/2016 | Liu et al. |
| 2017/0243110 | A1 | 8/2017 | Esquivel et al. |
| 2017/0286830 | A1 | 10/2017 | El-Yaniv et al. |
| 2018/0189638 | A1 | 7/2018 | Nurvitadhi et al. |
| 2018/0285736 | A1* | 10/2018 | Baum ............... G06N 3/084 |
| 2018/0373975 | A1 | 12/2018 | Yu et al. |
| 2019/0042945 | A1 | 2/2019 | Majumdar et al. |
| 2019/0042948 | A1* | 2/2019 | Lee ............... G06N 3/063 |
| 2019/0138882 | A1 | 5/2019 | Choi et al. |
| 2019/0171927 | A1 | 6/2019 | Diril et al. |
| 2019/0188557 | A1 | 6/2019 | Lowell et al. |
| 2019/0325314 | A1* | 10/2019 | Bourges-Sevenier ....... G06N 3/063 |
| 2019/0340492 | A1 | 11/2019 | Burger et al. |
| 2019/0340500 | A1* | 11/2019 | Olmschenk ......... G06N 3/0472 |
| 2019/0354842 | A1 | 11/2019 | Louizos et al. |
| 2020/0134461 | A1* | 4/2020 | Chai ............... G06N 3/0635 |
| 2020/0202213 | A1 | 6/2020 | Rouhani et al. |
| 2020/0210838 | A1 | 7/2020 | Lo et al. |
| 2020/0264876 | A1 | 8/2020 | Lo et al. |
| 2020/0302269 | A1 | 9/2020 | Ovtcharov et al. |
| 2021/0019630 | A1 | 1/2021 | Yao et al. |
| 2021/0034955 | A1 | 2/2021 | Sather et al. |

OTHER PUBLICATIONS

Boo, Yoonho, et al., "Structured Sparse Ternary Weight Coding of Deep Neural Networks for Efficient Hardware Implementations," 2017 IEEE Workshop on Signal Processing Systems (SiPS), Oct. 3-5, 2017, 6 pages, IEEE, Lorient, France.

Deng, Lei, et al., "GXNOR-Net: Training Deep Neural Networks with Ternary Weights and Activations without Full-Precision Memory under a Unified Discretization Framework," Neural Networks 100, Feb. 2018, 10 pages, Elsevier.

Wang, Peiqi, et al., "HitNet: Hybrid Ternary Recurrent Neural Network," 32nd Conference on Neural Information Processing Systems (NeurIPS '18), Dec. 2018, 11 pages, Montreal, Canada.

Achterhold, Jan, et al., "Variational Network Quantization," Proceedings of 6th International Conference on Learning Representations (ICLR 2018), Apr. 30-May 3, 2018, 18 pages, ICLR, Vancouver, BC, Canada.

Andri, Renzo, et al., "YodaNN: An Architecture for Ultra-Low Power Binary-Weight CNN Acceleration," IEEE Transactions on Computer-Aided Design of Integrated Circuits and Systems, Mar. 14, 2017, 14 pages, IEEE, New York, NY, USA.

Courbariaux, Matthieu, et al., "Binarized Neural Networks: Training Neural Networks with Weights and Activations Constrained to +1 or −1," Mar. 17, 2016, 11 pages, arXiv:1602.02830v3, Computing Research Repository (CoRR)—Cornell University, Ithaca, NY, USA.

Courbariaux, Matthieu, et al., "BinaryConnect: Training Deep Neural Networks with Binary Weights during Propagations," Proceedings of the 28th International Conference on Neural Information Processing Systems (NIPS 15), Dec. 7-12, 2015, 9 pages, MIT Press, Montreal, Canada.

Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.

Fu, Yao, et al., "Embedded Vision with INT8 Optimization on Xilinx Devices," WP490 (v1.0.1), Apr. 19, 2017, 15 pages, Xilinx, Inc., San Jose, CA, USA.

He, Zhezhi, et al., "Optimize Deep Convolutional Neural Network with Ternarized Weights and High Accuracy," Jul. 20, 2018, 8 pages, arXiv:1807.07948v1, Computing Research Repository (CoRR)—Cornell University, Ithaca, NY, USA.

Hegde, Kartik, et al., "UCNN: Exploiting Computational Reuse in Deep Neural Networks via Weight Repetition," Proceedings of the 45th Annual International Symposium on Computer Architecture (ISCA '18), Jun. 2-6, 2018, 14 pages, IEEE Press, Los Angeles, CA, USA.

Jain, Anil K., et al., "Artificial Neural Networks: A Tutorial," Computer, Mar. 1996, 14 pages, vol. 29, Issue 3, IEEE.

Judd, Patrick, et al., "Cnvlutin2: Ineffectual-Activation-and-Weight-Free Deep Neural Network Computing," Apr. 29, 2017, 6 pages, arXiv:1705.00125v1, Computer Research Repository (CoRR)—Cornell University, Ithaca, NY, USA.

Leng, Cong, et al., "Extremely Low Bit Neural Network: Squeeze the Last Bit Out with ADMM," Proceedings of 32nd AAAI Conference on Artificial Intelligence (AAAI-18), Feb. 2-7, 2018, 16 pages, Association for the Advancement of Artificial Intelligence, New Orleans, LA, USA.

Li, Fengfu, et al., "Ternary Weight Networks," May 16, 2016, 9 pages, arXiv:1605.04711v1, Computing Research Repository (CoRR)—Cornell University, Ithaca, NY, USA.

Merolla, Paul, et al., "Deep Neural Networks are Robust to Weight Binarization and Other Non-linear Distortions," Jun. 7, 2016, 10 pages, arXiv:1606.01981v1, Computing Research Repository (CoRR)—Cornell University, Ithaca, NY, USA.

Moshovos, Andreas, et al., "Exploiting Typical Values to Accelerate Deep Learning," Computer, May 24, 2018, 13 pages, vol. 51—Issue 5, IEEE Computer Society, Washington, D.C.

Non-published commonly owned U.S. Appl. No. 16/596,187, filed Oct. 8, 2019, 43 pages, Perceive Corporation.

Rastegari, Mohammad, et al., "XNOR-Net: ImageNet Classification Using Binary Convolutional Neural Networks," Proceedings of 2016 European Conference on Computer Vision (ECCV '16), Oct. 8-16, 2016, 17 pages, Lecture Notes in Computer Science, vol. 9908, Springer, Cham, Amsterdam, Netherlands.

Shayer, Oran, et al., "Learning Discrete Weights Using the Local Reparameterization Trick," Proceedings of 6th International Conference on Learning Representations (ICLR 2018), Apr. 30-May 3, 2018, 12 pages, ICLR, Vancouver, BC, Canada.

Shin, Dongjoo, et al., "DNPU: An 8.1TOPS/W Reconfigurable CNN-RNN Processor for General-Purpose Deep Neural Networks," Proceedings of 2017 IEEE International Solid-State Circuits Conference (ISSCC 2017), Feb. 5-7, 2017, 3 pages, IEEE, San Francisco, CA, USA.

Sze, Vivienne, et al., "Efficient Processing of Deep Neural Networks: A Tutorial and Survey," Aug. 13, 2017, 32 pages, arXiv:1703.09039v2, Computer Research Repository (CoRR)—Cornell University, Ithaca, NY, USA.

Zhang, Dongqing, et al., "LQ-Nets: Learned Quantization for Highly Accurate and Compact Deep Neural Networks," Jul. 26, 2018, 21 pages, arXiv:1807.10029v1, Computer Research Repository (CoRR)—Cornell University, Ithaca, NY, USA.

(56) References Cited

OTHER PUBLICATIONS

Zhou, Shuchang, et al., "DoReFa-Net: Training Low Bitwidth Convolutional Neural Networks with Low Bitwidth Gradients," Jul. 17, 2016, 14 pages, arXiv:1606.06160v2, Computer Research Repository (CoRR)—Cornell University, Ithaca, NY, USA.

Zhu, Chenzhuo, et al., "Trained Ternary Quantization," Dec. 4, 2016, 9 pages, arXiv:1612.01064v1, Computing Research Repository (CoRR)—Cornell University, Ithaca, NY, USA.

Falkner, Stefan, et al., "BOHB: Robust and Efficient Hyperparameter Optimization at Scale," Proceedings of the 35th International Conference on Machine Learning, Jul. 10-15, 2018, 19 pages, Stockholm, Sweden.

Louizos, Christos, et al., "Relaxed Quantization for Discretized Neural Networks," Proceedings of Seventh International Conference on Learning Representations (ICLR '19), May 6-9, 2019, 15 pages, New Orleans, Louisiana.

Mackay, Matthew, et al., "Self-Tuning Networks: Bilevel Optimization of Hyperparameters Using Structured Best-Response Functions," Proceedings of Seventh International Conference on Learning Representations (ICLR '19), May 6-9, 2019, 25 pages, New Orleans, Louisiana.

Withagen, Heini, "Reducing the Effect of Quantization by Weight Scaling," Proceedings of 1994 IEEE International Conference on Neural Networks (ICNN '94), Jun. 28-Jul. 2, 1994, 3 pages, IEEE, Orlando, Florida, USA.

\* cited by examiner

QUANTIZING NEURAL NETWORKS USING SHIFTING AND SCALING

BACKGROUND

In neural networks that are implemented on hardware that supports quantized values, it is the job of machine learning training algorithms to find the best encoding of the information in each feature map using the available value bits. Currently value quantization requires manual specification and tuning of value types, which is time consuming, error prone, and sacrifices quality. Accordingly, a method of improving value quantization by replacing manual intervention is required.

BRIEF SUMMARY

Some embodiments of the invention provide a novel method for training a quantized machine-trained network (e.g., a neural network). Such a machine-trained network includes one or both of (i) weight values quantized to a discrete set of values and (ii) activation functions that output quantized values. A pre-trained (or randomly initialized) floating-point neural network (i.e., a neural network with floating point weight values and/or activation functions that output floating point values) is provided, in some embodiments, as the basis for the quantized network. To train the quantized neural network, some embodiments scale a feature map of a pre-trained floating-point neural network in order to match the range of output values provided by quantized activation functions in a quantized neural network. Some embodiments scale the feature map by determining a distribution of values for each input of a layer of the neural network and selecting a set of scaling and shift values for each layer based on the determined distribution of values.

A pre-trained floating-point neural network, in some embodiments, includes at least one unbounded activation function (e.g., a rectified linear unit [ReLU]) that produces a distribution of values that may be poorly modeled by a quantized value (e.g. a 4-bit U2.2 value) because values are larger than can be represented by the quantized value and are truncated, or because values are smaller than the smallest value and quantization error is large. Some embodiments perform an initial scaling that preserves the feature maps computed by the pre-trained neural network using affine transformations that are constrained based on the type of computation performed by a computation node. During training, the learned affine transformations will be able to update the initial scales in order to improve accuracy and adapt to value and weight quantization.

In some embodiments, the initial scaling is performed by first running training items through the network with value quantization bypassed and measuring the distribution of activation inputs and outputs for each layer. After measuring the distribution of activation inputs and outputs for each layer, the process determines what scale factor ($y_{output}$) needs to be applied to the output distribution in order to fit into the output range of the quantized activation function (e.g., a quantized ReLU having an output range of [0,3.75]). Some embodiments measure the 99% confidence level and set the scale factor ($\gamma_{output}$) such that that interval just fits into the output window. Additionally, the process determines what scale factor ($\gamma_{input}$) needs to be applied to the quantized activation in order to compensate for the output scaling. For the common case of a ReLU activation function $\gamma_{input}=1/\gamma_{output}$. After determining the scaling factors, input scaling is applied by multiplying the initial scale in the affine transform prior to the value quantization by $\gamma_{input}$. For quantized activation functions, some embodiments use a lookup table (LUT) to implement the activation function (because only a particular number of output activation values are allowed). In some embodiments that do not use batch normalization, values in the LUT for activations are multiplied by $\gamma_{output}$ and a LUT reversion transform for the layer is updated to correct for $\gamma_{output}$ in value/bias quantization (and in a compiler that prepares the network for execution by an inference circuit). For some embodiments that do use batch normalization (e.g., for all fanout layers), output scaling is not used as the output is invariant under rescaling of all inputs by a same factor.

The process above, in some embodiments, is performed on each layer in topological order so that a scaling for each layer is determined based on the distribution of value-quantized inputs produced by the upstream layers. For embodiments including a recurrent network, this process is performed iteratively. In some embodiments, this is necessary because applying the scale factors does not exactly preserve the distribution of values produced by a layer (even if $\gamma_{input}*\gamma_{output}=1$). Layers using activation functions with bounded output values (e.g., sigmoid or tanh) do not need scaling, in some embodiments, as the floating-point network is already adapted to the input and output ranges of such an activation. While described above in relation to a pre-trained floating-point neural network, a similar process can also be used in some embodiments for untrained (e.g., randomly initialized) networks to ensure that the activation values fall in the available range of quantized activations.

In addition, some embodiments modify a quantization function to be differentiable to resolve a mismatch between a loss function computed during forward propagation and a loss gradient used in back propagation. The modified (e.g., approximate) quantization function, in some embodiments, is a differentiable approximation to a step-wise quantization function that is used in a backpropagation operation during training to adjust the weights of the received neural network. Relaxed quantization is used, in some embodiments, to generate a differentiable quantization function.

Some embodiments employ a unified value quantization method. The quantization, in some embodiments, is phased in by computing each activation value using a convex combination of the continuous (non-quantized) and quantized activation functions $\alpha(x; \xi) = \xi * \alpha_{continuous}(x) + (1-\xi) * \alpha_{quantized}(x)$ where $\xi$ is initially set to 1 and over time is forced to 0 (e.g., using a Lagrange constraint). In some embodiments, $\xi$ is a learned parameter defined per layer. In other embodiments, a differentiable approximation to the quantization function that reduces to a piecewise-linear function at a limit of a tunable (or learnable) parameter is used. The differentiable approximation, in some embodiments, is a sufficiently close approximation to the continuous activation function that no phase-in is required.

Variational information bottleneck, in some embodiments, is incorporated to train the network to be insensitive to multiplicative noise applied to each channel. In some embodiments, channels that finish training with large amounts of noise (e.g., exceeding 100%) are pruned. Because value quantization trains the network to tolerate rounding of activations to 4-bit values there is an in-built information bottleneck that limits the amount of information transmitted by any activation value to 4 bits. If the information transmitted by each activation value in a channel is further reduced to 0 bits the channel is pruned. Once the network has been trained and pruned, the weight values are quantized in based on the training.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Some embodiments of the invention provide a novel method for training a quantized machine-trained network (e.g., a neural network). Such a machine-trained network includes one or both of (i) weight values quantized to a discrete set of values and (ii) activation functions that output quantized values. A pre-trained (or randomly initialized) floating-point neural network (i.e., a neural network with floating point weight values and/or activation functions that output floating point values) is provided, in some embodiments, as the basis for the quantized network. To train the quantized neural network, some embodiments scale a feature map of a pre-trained floating-point neural network in order to match the range of output values provided by quantized activation functions in a quantized neural network. Some embodiments scale the feature map by determining a distribution of values for each input of a layer of the neural network and selecting a set of scaling and shift values for each layer based on the determined distribution of values.

A pre-trained floating-point neural network, in some embodiments, includes at least one unbounded activation function (e.g., a rectified linear unit [ReLU]) that produces a distribution of values that may be poorly modeled by a quantized value (e.g. a 4-bit U2.2 value) because values are larger than can be represented by the quantized value and are truncated, or because values are smaller than the smallest value and quantization error is large. Some embodiments perform an initial scaling that preserves the feature maps computed by the pre-trained neural network using affine transformations that are constrained based on the type of computation performed by a computation node. During training, the learned affine transformations will be able to update the initial scales in order to improve accuracy and adapt to value and weight quantization.

Figure 1:
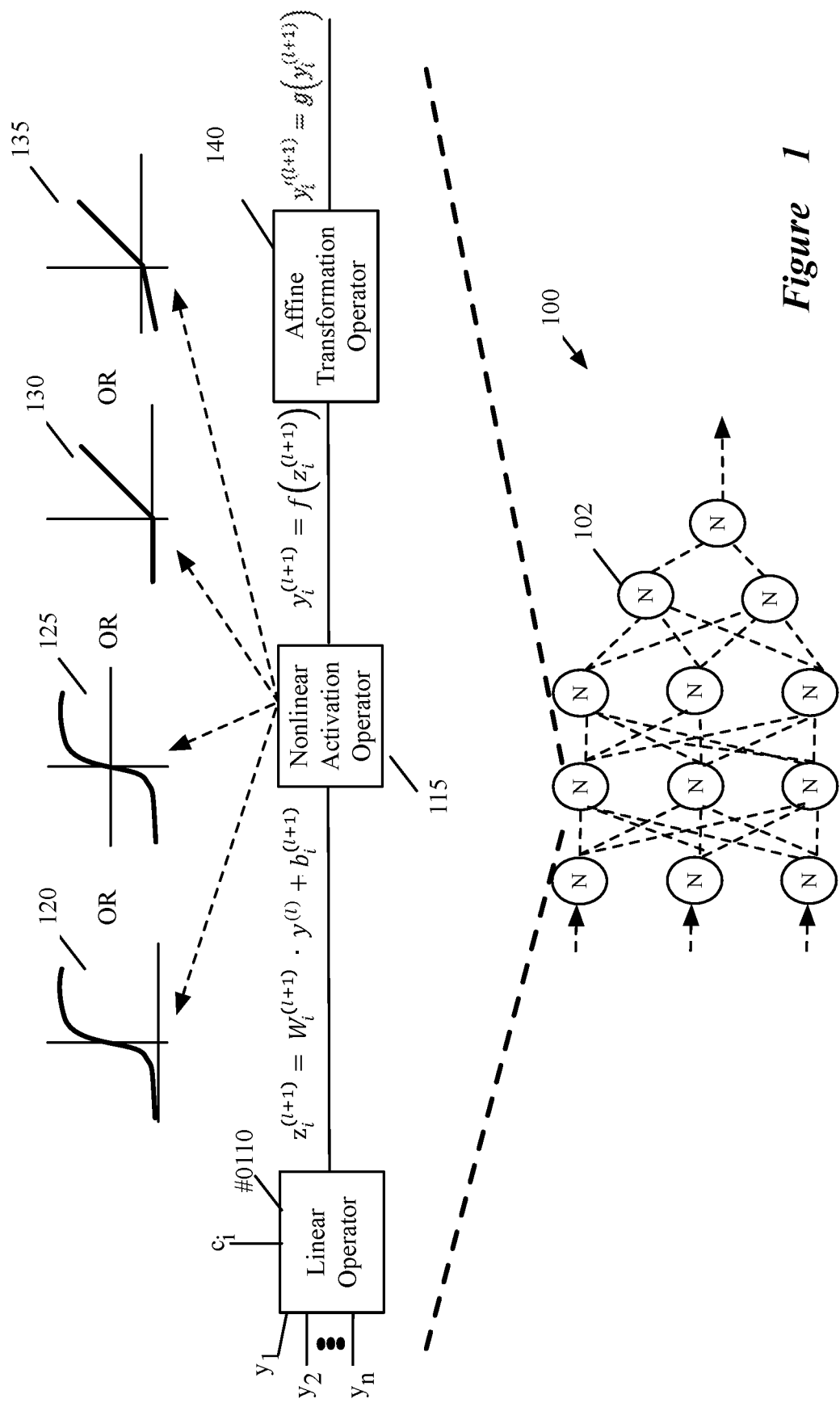
FIG. 1 illustrates a simple feed-forward neural network with two hidden layers having three nodes, and a single output layer with one output node.

FIG. 1 illustrates an example of a multi-layer machine-trained network of some embodiments. This figure illustrates a feedforward neural network 100 that has multiple layers of processing nodes, called neurons 102. In all but the first (input) and last (output) layer, each neuron 102 receives two or more outputs of neurons from earlier processing node layers and provides its output to one or more neurons in subsequent layers. The output of the neuron in the last layer represents the output of the network 100. In some embodiments, the output of the network 100 is a number in a range of values (e.g., 0 to 3.75). In this example, the neural network 100 only has one output node. Other neural networks of other embodiments have several output nodes that provide more than one output value. In addition, the neural networks of other embodiments may be types of networks other than feed forward networks (e.g., recurrent networks, convolutional networks, etc.).

As shown in FIG. 1, each neuron in neural network 100 has a linear component 110, a nonlinear component 115, and an output transformation component 140. The linear component 110 of each hidden or output neuron in this example computes a dot product of a vector of weight coefficients and a vector of output values of prior nodes, plus an offset. In other words, a hidden or output node's linear operator computes a weighted sum of its inputs (which are outputs of the previous stage neurons that the linear operator receives) plus an offset. In some embodiments, the linear component 110 includes a scaling and shifting operation on the inputs (e.g., a fanin component) to apply an affine transformation to each input individually or as a group. Similarly, the linear component 110 of each input neuron of some embodiments computes a dot product of a vector of weight coefficients and a vector of input values, plus an offset. In other embodiments, each input neuron receives a single input and passes that input as its output. Each neuron's nonlinear component 115 computes a function based on the output of the neuron's linear component 110. This function is commonly referred to as the activation function. The output transformation component 140 applies a second affine transformation to the result of the nonlinear component 115 (e.g., as a fanout component). In some embodiments, the second affine transformation is used to mitigate the effect of the first affine transformation performed by the linear component 110.

The notation of FIG. 1 can be described as follows. Consider a neural network with L-1 hidden layers (i.e., L layers including the input layer and the output layer). The variable l can be any of the hidden layers (i.e., $l \in \{1, \ldots, L-1\}$ index the hidden layers of the network, with l=0 representing the input layer and l=L representing the output layer). The variable $z_i^{(l+1)}$ represents the output of the linear component of a hidden neuron i in layer l+1. As indicated by the following Equation (1), the variable $z_i^{(l+1)}$ is computed as the dot product of a vector of weight values $W_i^{(l+1)}$ and a vector of outputs $y^{(l)}$ from layer l plus an offset $b_i$, typically referred to as a bias.

$$z_i^{(l+1)} = W_i^{(l+1)} \cdot y^{(l)} + b_i^{(l+1)} = \Sigma_{k=1}^n (w_{ik}^{(l+1)} * y_k^{(l)}) + b_i^{(l+1)} \qquad (1)$$

The symbol * is an element-wise product, while the symbol · is the dot product. The weight coefficients $W^{(l)}$ are parameters that can be adjusted during the network's training in order to configure this network to solve a particular problem.

The output $y^{(l+1)}$ of the nonlinear component 115 of a neuron in layer l+1 is a function of the neuron's linear component, and can be expressed as by Equation (2) below.

$$y_i^{(l+1)} = f(z_i^{(l+1)}) \qquad (2)$$

In this equation, $f$ is the nonlinear activation function for node i. Examples of such activation functions include a sigmoid function 120 ($f(x)=1/(1+e^{-x})$), a tanh function 125, a ReLU (rectified linear unit) function 130 or a leaky ReLU function 135, as shown.

Traditionally, the sigmoid function and the tanh function have been the activation functions of choice. More recently, the ReLU function ($f(x)=\max(0, x)$) has been proposed for the activation function in order to make it easier to compute the activation function. See Nair, Vinod and Hinton, Geoffrey E., "Rectified linear units improve restricted Boltzmann machines," ICML, pp. 807-814, 2010. Even more recently, the leaky ReLU has been proposed in order to simplify the training of the processing nodes by replacing the flat section (i.e., x<0) of the ReLU function with a section that has a slight slope. See He, Kaiming, Zhang, Xiangyu, Ren, Shaoqing, and Sun, Jian, "Delving deep into rectifiers: Surpassing human-level performance on imagenet classification," arXiv preprint arXiv:1502.01852, 2015. In some embodiments, the activation functions can be other types of functions, like cup functions and periodic functions.

Equation (2) can be expressed in the following expanded format of Equation (3).

$$y_i^{(l+1)} = f(z_i^{(l+1)}) = f[(\Sigma_{k=1}^n w_{ik} * y_k) + b_i^{(l+1)}] \qquad (3)$$

In this equation, $w_{ik}$ are weight values associated with the inputs $y_k$ of the neuron i in layer l+1.

In some embodiments, multiple kernels are applied to a set of input data to generate multiple output clusters (sometimes referred to as channels) and the weights for the different kernels are trained independently in a convolutional layer. In some embodiments, a kernel is applied to a set of nodes to reduce the number of output nodes (e.g., by using a stride greater than 1 when applying the kernel). As an additional function of a convolutional layer, pooling is used in some embodiments to reduce the size of the output node clusters. In some embodiments, pooling layers are separate from the convolutional layers. Pooling in some embodiments uses one of a maximum or an average of a number of data values (e.g., pixel values in an area of an image) to represent the multiple data values as a single value thus reducing the number of nodes (data values) by a factor proportional to the number of data values used in the pooling calculation.

After the input data has been put through a number of convolutional layers comprising a contracting part of the convolutional network, the data is then put through a series of layers in an expanding part of the convolutional network that is used to increase the resolution (i.e. the number of nodes/pixels) of the reduced-resolution hidden layers and compute the associated output. In some embodiments, the series of layers in the expanding part of the convolutional network include various convolutional layers, such as upconvolutional (sometimes referred to as upsampling, deconvolutional, or transpose convolutional) layers that increase the number of nodes (data values) in an output node cluster (i.e., channel) as well as standard convolutional layers that maintain the number of nodes in an output node cluster (i.e., channel). In some embodiments, the output of the earlier convolutional layers in the contracting part is used as inputs for layers in the expanding part of the convolutional network.

Once the nonlinear component 115 computes $y_i^{(l+1)}$ the output transformation component 140 performs an affine transformation (i.e., a scaling and shifting operation) to produce a modified output vector that generally takes the form of Equation (4) below.

$$y'^{(l+1)}_i = g(y_i^{(l+1)}) \qquad (4)$$

Where $g(y_i^{(l+1)})$ may be an affine transformation that is applied to all components of the output vector $y_i^{(l+1)}$ or a set of affine transformations applied to each component (channel) of the output vector $y_i^{(l+1)}$ individually (e.g., different affine transformations for each component).

Figure 2:
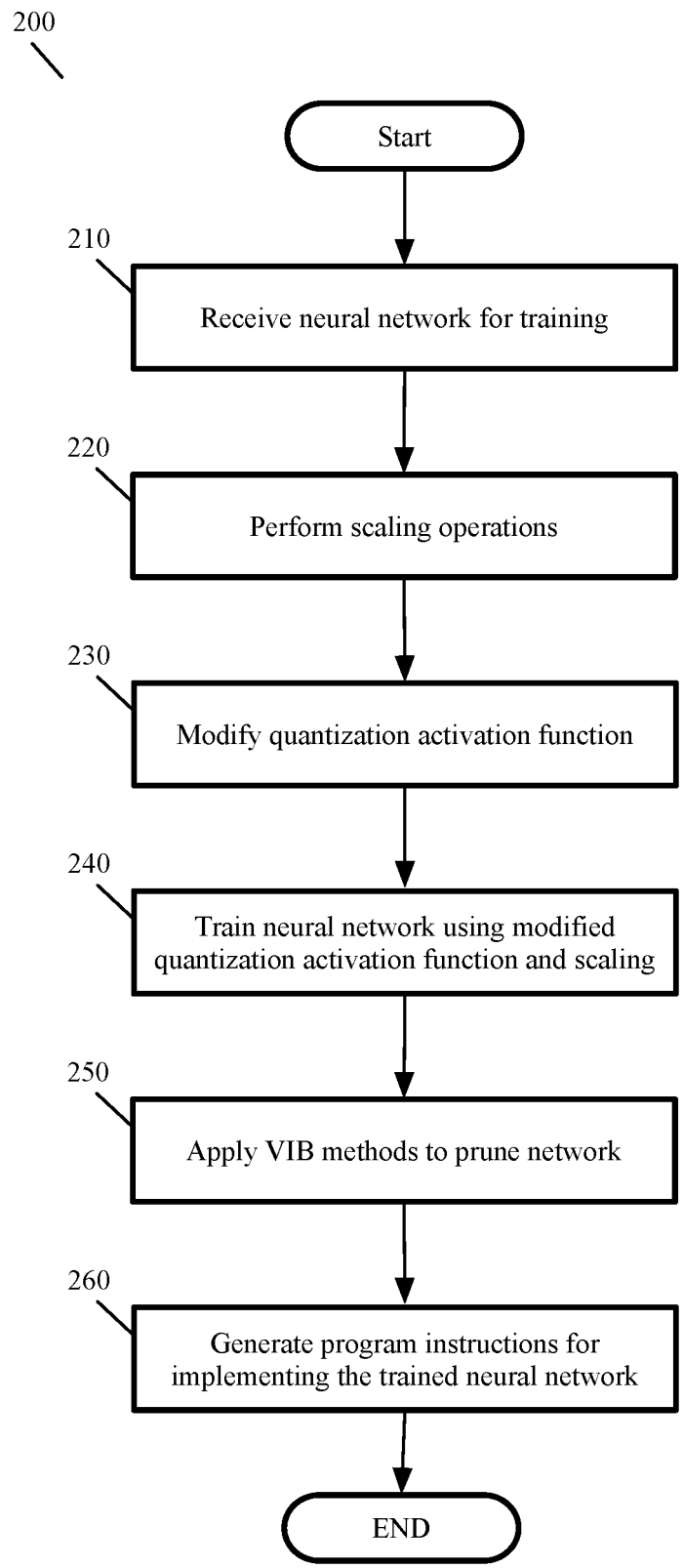
FIG. 2 conceptually illustrates a process 200 for training a quantized machine-trained network.

FIG. 2 conceptually illustrates a process 200 for training a quantized machine-trained network. Process 200 begins by receiving (at 210) a network to train. In some embodiments, the received network is a pre-trained floating-point network to be quantized. The received network, in some embodiments, is a randomly initialized network. The received network, in some embodiments, includes a set of layers that have unbounded activation function (e.g., a ReLU).

After receiving (at 210) the network to train, the process performs (at 220) scaling operations. In some embodiments, an initial scaling is performed by first running training items through the network with value quantization bypassed and measuring the distribution of activation inputs and outputs for each layer. After measuring the distribution of activation inputs and outputs for each layer, the process determines what scale factor ($\gamma_{output}$) needs to be applied to the output distribution in order to fit into the output range of the quantized activation function. (e.g., a quantized ReLU having an output range of [0,3.75]). Some embodiments measure the 99% confidence level and set the scale factor ($\gamma_{Output}$) such that that interval just fits into the output window. Additionally, the process determines what scale factor ($\gamma_{input}$) needs to be applied to the quantized activation in order to compensate for the output scaling. For the common case of a ReLU activation function $\gamma_{input} = 1/\gamma_{Output}$. After determining the scaling factors, input scaling is applied by multiplying the initial scale in the affine transform prior to the value quantization by $\gamma_{input}$. For quantized activation functions, some embodiments use a lookup table (LUT) to implement the activation function (because only a particular number of output activation values are allowed). In some embodiments that do not use batch normalization, values in the LUT for activations are multiplied by $\gamma_{Output}$ and a LUT reversion transform for the layer is updated to correct for $\gamma_{Output}$ in value/bias quantization (and in a compiler that prepares the network for execution by an inference circuit). For some embodiments that do use batch normalization (e.g., for all fanout layers), output scaling is not used as the output is invariant under rescaling of all inputs by a same factor.

The scaling operation, in some embodiments, is performed on each layer in topological order so that a scaling for each layer is determined based on the distribution of value-quantized inputs produced by the upstream layers. Some embodiments include a recurrent network, and this process is performed iteratively. In some embodiments, this is necessary because applying the scale factors does not exactly preserve the distribution of values produced by a layer (even if $\gamma_{input}*\gamma_{output}=1$). Layers using activation functions with bounded output values (e.g., sigmoid or tanh) do not need scaling, in some embodiments, as the floating-point network is already adapted to the input and output ranges of such an activation. While described above in relation to a pre-trained floating-point neural network, a similar process can also be used in some embodiments for untrained (e.g., randomly initialized) networks to ensure that the activation values fall in the available range of quantized activations.

In some embodiments, the set of scaling operations is implemented so that, when starting from a network trained with floating-point values, quality is maintained when activation quantization is introduced (without retraining network parameters). For example, the loss value should not increase significantly. Additionally, scaling and shifting values are initialized, in some embodiments, such that the information contained in feature maps produced throughout the network is maximally preserved by the value quantization. Similarly, when starting from an untrained network with random weights, the scales, in some embodiments, are set to maximize the entropy of the quantized value distributions, to make it easier for the network to learn.

The set of scaling operations is designed, in some embodiments, to set the scale and shift for each node of the network so as to minimize the loss of information due to value quantization. In changing the scale (and shift) for a network node the values of node outputs are also changed, which typically changes the output of the network. In some embodiments, to prevent the network output from changing, compensatory changes to the scale and shift in an output component of a node are made. For example, given a network using floating-point values, the scaling operations identify a symmetry group that preserves the network output. This group of symmetries may be generated in some embodiments by applying an affine transformation within one node and then applying a corresponding (typically inverse) affine transformation within the fanin (i.e., input) component of a subsequent node. For a given network, the scaling operations apply a symmetry transformation that minimizes the loss of information when converting the network to a value-quantized network.

Assuming that the input to a node is transformed according to $x'_{in} = \gamma_{in}(x_{in}+\beta_{in})$ and that before initializing scales and shifts, the original affine transformation in the node is $v_c = \gamma\gamma_c(u_c+\beta_c)$ where $u_c$ refers to the channel "c" of the output of the node core operation (conv, FC, pool, etc.) that is the input to the node's output affine transformation. $v_c$ refers to the result of applying the node's affine transformation to $u_c$. After absorbing the input scale and shift, the node's output affine transformation becomes $v'_c = \gamma'_c(u'_c+\beta'_c)$ with $\gamma'_c$ and $\beta'_c$ chosen, in some embodiments, such that the effect of the fanin (input) affine transformation is exactly canceled (i.e., $v'_c = v_c$). While most nodes can absorb a scale (and shift) of their input, some nodes have a limited ability to do this, and this constrains the ability to optimize the scale/shift of their fanin components (i.e., a component of a network node that accepts inputs from previous network nodes and performs a first scaling and/or shifting operation on each input before further processing by the node).

For example, while a convolution, or fully-connected, layer using batch normalization does not place restrictions on the input affine transforms or the scale and shift applied, in the absence of a batch normalization, the scale ($\gamma'_c$) and shift ($\beta'_c$) for a given channel are given by $\beta'_c = \gamma_{in}(\beta_c - \beta_{in} w * 1_c)$ and $\gamma'_c = \gamma_c/\gamma_{in}$ where $1_c$ is a tensor that is all 1s for channel c and 0 for all other channels. For a pooling operation the scale ($\gamma'_c$) and shift ($\beta'_c$) for a given channel are given by $\beta'_c = \gamma_{in}(\beta_c - \beta_{in})$ and $\gamma'_c = \gamma_c/\gamma_{in}$. For an elementwise addition, in some embodiments, inputs must be scaled by a same factor and the shift ($\beta'_c$) is given by $\beta'_c = \beta_c - \beta_{in1} - \beta_{in2}$. In some embodiments, for an elementwise multiplication, the inputs cannot be shifted and the scaling ($\gamma'_c$) is given by $\gamma'_c = \gamma_c/(\gamma_{in1}\gamma_{in2})$ For concatenation operations, inputs must be scaled and shifted by the same amount but there is no affine transformation associated with concatenation operations. For recurrent neural networks, in some embodiments, all time steps use a same affine transformation.

Given a distribution of values to quantize, a scale and shift of the optimal quantization can be selected by alternately minimizing the sum of squared quantization errors over the scale, shift, and bin assignment. For a positive homogeneous function like ReLU (or PreLU or leaky ReLU), scaling the input by a positive scaling factor simply rescales the output (e.g., $\gamma > 0 \Rightarrow \text{ReLU}(\alpha x) = \alpha \text{ReLU}(x)$). Similarly, scaling in the input of a (hypothetical) quadratic activation function by $\alpha$ scales all activation outputs by $\alpha^2$. However, many commonly used activation functions are not homogeneous: sigmoid, tanh, ELU, Swish, etc. If the input to such an activation function is rescaled, in some embodiments, this change cannot necessarily be compensated for by modifying the scale/shift of fanout components of nodes (i.e., a component of a network node that performs scaling and/or shifting operation on each output of a non-linear component of the network node before providing the output to a subsequent node of the network). In such situations, possible solutions include: (1) determining the affine transformation that best approximates the change in the output distribution, (2) choosing the look up table (LUT) program that best approximates the portion of the activation that is actually used by the floating-point network, and (3) skip the scaling (and shifting) if the initial quantization is good enough.

After performing (at 220) the scaling operations, the process 200 modifies (at 230) the quantization activation function to be differentiable. One of ordinary skill in the art will appreciate that the modification in some embodiments is performed independently of the scaling operations. In some embodiments, the quantization function is modified to fix the mismatch between the loss function computed in forward propagation and the loss gradient used in backward propagation. Relaxed quantization is described in "Relaxed Quantization for Discrete Neural Networks," by Louizos et al., in conference paper at International Conference Learning Representations (ICLR), May 2019, available at https://openreview.net/forum?id=HkxjYoCqKX, which is hereby incorporated by reference. Such a relaxed quantization process is used, in some embodiments, to generate a differentiable quantization function. Other embodiments employ an approximate quantization function as part of a unified value quantization method. The quantization, in some embodiments, is phased in during the training (at 240) by computing each activation value using a convex combination of the continuous (non-quantized) and quantized activation functions $\alpha(x; \xi) = \xi * \alpha_{continuous}(x) + (1-\xi) * \alpha_{quantized}(x)$ where $\xi$ is initially set to 1 and over time is forced to 0 (e.g., using a Lagrange constraint). In some embodiments, is a learned parameter defined per layer. In other embodiments, a differentiable approximation to the quantization function reduces to a piecewise-linear function at a limit of a tunable (or learnable) parameter which might be a sufficiently close approximation to the continuous activation function that no phase-in is required.

After modifying (at 230) the quantization function, the process trains (at 240) the machine-trained network using the modified quantization function. In some embodiments, the training introduces noise (e.g., additive and/or multiplicative noise). In some embodiments, the noise is pre-quantization noise while in other embodiments the noise is post-quantization noise. These noise terms are described in more detail below.

After training (at 240) the machine-trained network, the process 200 performs (at 250) variational information bottleneck (VIB) methods to prune the network. The VIB methods, in some embodiments, are incorporated to train the network to be insensitive to multiplicative noise applied to each channel. In some embodiments, channels that finish training with large noise (e.g., exceeding 100%) are pruned. Because value quantization trains the network to tolerate rounding of activations to 4-bit values there is an in-built information bottleneck that limits the amount of information transmitted by any activation value to 4 bits. If the information transmitted by each activation value in a channel is further reduced to 0 bits the channel is pruned.

After pruning the non-informative channels, the process 200 generates (at 260) a set of program instructions for implementing the trained network in hardware optimized for implementing quantized networks. Some embodiments train the network with a particular hardware chip in mind. For example, the network is trained for a hardware chip such as that described in U.S. patent application Ser. No. 16/355,653, now issued as 11,531,868, which is hereby incorporated by reference, that is designed to implement quantized networks.

In some embodiments, operation 230 of FIG. 2 is performed to relax the piecewise-constant quantization function because in the limit that the width of a transition of the quantization function goes to zero the variance of the gradient goes to infinity. Some embodiments attempt to minimize the gradient variance of the approximate quantization function while simultaneously minimizing the distortion (measured as $[y(x)-Q(x)]^2$, where $y(x)$ is the approximate quantization function and $Q(x)$ is the quantization function) of the values produced by the approximate quantization function. In some embodiments, operation 230 generates a function that minimizes gradient variance for a given value distortion.

In some embodiments, the piecewise-constant quantization function (i.e., $Q(x)$) has discontinuities at $x_i$ for $1 \le i \le n$ and has a $q_i$ associated with each $x_i$ such that:

$$Q(x)=q_i \text{ for } x_i \le x \le x_{i+1}, \text{ for } 0 \le i \le n \text{ with } x_0=x_{min} \text{ and } x_{n+1}=x_{max} \tag{5}$$

In the equation above, $x_{min}$ and $x_{min}$ correspond to the endpoints of the allowed range of x but do not correspond to any discontinuity. To estimate the gradient variance and value distortion, some embodiments assume that x is uniformly distributed over the input range so that the variance of the gradient is proportional to the variance of $$y'(x) = \frac{dy}{dx}$$

over the input range. With these assumptions, the expectation of $y'(x)$ is proportional to the integral of $y'(x)$, which is the constant $q_n-q_0$. To minimize the variance of the gradient, some embodiments minimize the expectation of $y'(x)^2$. Additionally, some embodiments use a quadratic distortion function so that the value distortion, D, is the expectation of $[y(x)-Q(x)]^2$.

In some embodiments, in order to find a function $y(x) \approx Q(x)$ that minimizes the gradient variance for a given value distortion the constrained minimization function is formulated using the following Lagrangian:

$$L(y,y')=\mathbb{E}[(y')^2]+\lambda \mathbb{E}[(y-Q)^2] \tag{6}$$

In Equation (6), $\lambda > 0$ is a Lagrange multiplier that specifies the degree to which the process attempts to reduce the distortion. For the interval $x_i \le x \le x_{i+1}$ the contribution to the Lagrangian is:

$$L(y,y')=\int_{x_i}^{x_{i+1}} dx [(y')^2+\lambda(y-q_i)^2] \tag{7}$$

Making a connection with Lagrangian mechanics, x can be thought of as a time coordinate, so that $y'(x)^2$ is a kinetic energy. The (time-dependent) potential energy is represented by $-\lambda[y(x)-Q(x)]^2$, which represents an "antispring" that exerts an increasingly repulsive force as it is stretched. This Lagrangian describes the dynamics of a particle moving in one dimension at position $y(x)$ traveling in a potential that repels the particle away from the position $q_i$, during the "time interval" $x_i \le x \le x_{i+1}$. While it seems counterintuitive to have a repulsive potential, this ensures that the particle spends a longtime near the (unstable) equilibrium at $y(x)=q_i$, and spends little time at positions far from $q_i$. Note also that in Lagrangian mechanics the "Lagrangian" is defined at instant in time and the time integral of the Lagrangian, our L, is called the action. When L is minimized the principle of least action is applied.

Some embodiments fix the values of $y(x)$ at each step to be $y(x_i)=y_i$ with the values $y_i$ yet to be determined. In such embodiments, for $y(x)$ to minimize L on this interval it must satisfy the Euler-Lagrange differential equation:

$$0 = \frac{\partial L}{\partial y} - \frac{d}{dx}\left(\frac{\partial L}{\partial y'}\right) = 2[\lambda(y-q_i)-y''] \tag{8}$$

If a new variable, $\beta=\sqrt{\lambda}$, V, is introduced, the solutions to the Euler-Lagrange Equation (8) satisfy the differential equation $\beta^2(y-q_1)=(y-q_i)''$ which has the general solution:

$$y_i(x)=q_i+A_i\exp(\beta(x-x_{i+1}))+B_i\exp(\beta(x_i-x)) \tag{9}$$

In Equation (9), $A_i$ and $B_i$ are selected to satisfy the boundary conditions $y(x_i)=y_i$. Some embodiments select the form of each exponent so that its maximum value on the interval $[x_i, x_{i+1}]$ is 0 to avoid numerical overflow and minimize underflow.

To determine the coefficients $A_i$ and $B_i$ some embodiments impose the boundary conditions that $y(x)$ is continuous at each x, and also that $\lim_{x \to -\infty} y(x)=q_0$ and $\lim_{x \to \infty} y(x)=q_n$. If any of those conditions are not satisfied, then L will be infinite and thus obviously not minimal. In addition, satisfying the Euler-Lagrange equation only ensures that each contribution to the Lagrangian $L_i(y,y')$ is minimized subject to fixed $y_i$. To minimize the total Lagrangian $L=\Sigma_{i=0}^{n} L_i$, some embodiments further require y' to be continuous at each $x_i$. Returning to the mechanical analogy, this corresponds to conservation of momentum. Thus, there are 2 boundary conditions for the asymptotic value of y, n boundary conditions for the continuity of y, and n for the continuity of y' for a total of $2(n+1)$ linear constraints on the $2(n+1)$ variables $A_i$ and $B_i$. Two of the boundary conditions, $\lim_{x \to -\infty} y(x) = q_0$ and $\lim_{x \to \infty} y(x) = q_n$, imply that $B_0 = 0$ and $A_n = 0$. The complete set of constraint equations is:

$$B_0 = 0 \quad (10)$$

$$A_{i+1}\exp(-\beta \Delta x_{i+1}) + B_{i+1} = A_i + B_i \exp(-\beta \Delta x_i) - \Delta q_i \quad (11)$$

$$A_{i+1}\exp(-\beta \Delta x_{i+1}) - B_{i+1} = A_i - B_i \exp(-\beta \Delta x_i) \quad (12)$$

$$A_n = 0 \quad (13)$$

where $\Delta x_i \equiv x_{i+1} - x_i$ and $\Delta q_i \equiv q_{i+1} - q_i$. Solving for $A_i$ and $B_i$:

$$B_o = 0 \quad (14)$$

$$A_{i+1}\exp(-\beta \Delta x_{i+1}) = A_i - \frac{\Delta q_i}{2} \quad (15)$$

$$B_{i+1} = B_i \exp(-\beta \Delta x_i) - \frac{\Delta q_i}{2} \quad (16)$$

$$A_n = 0 \quad (17)$$

Each $A_i$ can be computed starting from $A_n = 0$ using a recurrence relation that yields $A_i$ given $A_{i+1}$:

$$A_i = A_{i+1}\exp(-\beta x_{i+1}) + \Delta q_i/2 \quad (18)$$

Each $B_1$ can be computed starting from $B_0 = 0$ using a recurrence relation that yields $B_{i+1}$ given $B_i$:

$$B_{i+1} = B_i \exp(-\beta x_i) - \Delta q_i/2 \quad (19)$$

Note that $x_0$, the lower endpoint of the x range, only appears in $y_0(x)$ and in the computation of $B_1$ and in each case it appears in an exponential term where it is multiplied by $B_0 = 0$. Similarly, $x_{n+1}$, the upper endpoint of the x range, only appears multiplied by $A_n = 0$. Because the approximate quantization function is independent of $x_0$ and $x_{n+1}$, any values that are convenient for the implementation can be picked.

The distortion for each interval $[x_i, x_{i+1}]$ is given by:

$$D_i = \int_{x_i}^{x_{i+1}} dx (y_i(x) - q_i)^2 = \quad (20)$$
$$\frac{1}{2\beta}(A_i^2 + B_i^2)(1 - \exp(-2\beta \Delta x_i)) + 2A_i B_i \Delta x_i \exp(-\beta \Delta x_i)$$

In the limit of low temperature $T \equiv 1/\beta$, $A_i \approx \Delta q_i/2$ and $B_i \approx -\Delta q_{i-1}/2$ (with $\Delta q_{-1} = 0$ and $\Delta q_n = 0$) $D_i$ is approximated by:

$$D_i \approx \frac{(\Delta q_{i-1})^2 + (\Delta q_i)^2}{8} T, \ (T \approx 0) \quad (21)$$

The average distortion over the entire range of $[x_{min}, x_{man}]$ is given by:

$$D = \frac{\sum_{i=0}^{n} D_i}{x_{max} - x_{min}} \approx \frac{\sum_{i=1}^{n-1} (\Delta q_i)^2}{4(x_{max} - x_{min})} T \quad (22)$$

The approximate quantization function satisfies the following Helmholtz differential equation:

$$y''(x) - \beta^2 y(x) = -\beta^2 Q(x) \quad (23)$$

The above Equation (23) can be solved for $y(x)$ by finding the Green's function $G(x, x_0)$ for the Helmholtz equation which satisfies $$\frac{\partial^2 G(x, x_0)}{\partial x^2} - \beta^2 G(x, x_0) = \delta(x - x_0) \quad (24)$$

with boundary conditions $$\lim_{x \to \pm\infty} \frac{\partial G(x, x_0)}{\partial x} = 0 \quad (25)$$

The required Green's function is $$G(x, x_0) = -\frac{1}{2\beta}\exp(-\beta|x - x_0|) \quad (26)$$

The approximate quantization function is then computed in terms of the Green's function as $$y(x) = \int_{-\infty}^{\infty} dx_0 G(x, x_0)[-\beta^2 Q(x_0)] \quad (27)$$

$$= \frac{\beta}{2}\int_{-\infty}^{\infty} dx_0 \exp(-\beta|x - x_0|)Q(x_0) \quad (28)$$

$$= \frac{\beta}{2}\int_{-\infty}^{\infty} d\epsilon \exp(-\beta|\epsilon|)Q(x + \epsilon) \quad (29)$$

Which can be shown to be equivalent to the sum of exponentials as described above (Eqs. 9 to 20).

The form of the approximate quantization function derived using a Green's function can be interpreted as the expectation of quantized noisy input:

$$y(x) = \mathbb{E}_{\epsilon}[Q(x+\epsilon)], \epsilon \sim \text{Laplace}(\mu=0, b=T) \quad (30)$$

In some embodiments, the input noise is additive, zero-mean Laplacian noise with diversity equal to the temperature $b = T = 1/\beta$. This perspective suggests that the variance of the quantized output due to additive input noise should also be taken into account. In some embodiments, the variance of the quantized output is defined as:

$$\text{Var}_\epsilon[Q(x+\epsilon)] = \mathbb{E}_\epsilon[Q(x+\epsilon)^2] - \mathbb{E}_\epsilon[Q(x+\epsilon)]^2 \quad (31)$$

$$= \mathbb{E}_\epsilon[Q(x+\epsilon)^2] - y(x)^2 \quad (32)$$

$$\equiv s(x) - y(x)^2 \quad (33)$$

Given that $s(x)$ is the expectation of $Q^2(x+\epsilon)$ it has the same form as $y(x)$ except with $q_i$ replaced by $q_i^2$, resulting in the following solutions for $s_i(x)$:

$$s_i(x) = q_i^2 + C_i \exp(\beta(x - x_{i+1})) + D_i \exp(\beta(x_i - x)) \quad (34)$$

Coefficients $C_1$ and $D_1$ are given by the recurrence relations:

$$C_n = 0 \quad (35)$$

$$C_i = C_{i+1}\exp(-\beta \Delta x_{i+1}) + (q_{i+1}^2 - q_i^2)/2 \quad (36)$$

and $$D_0 = 0 \quad (37)$$

$$D_{i+1} = D_i \exp(-\beta \Delta x_i) - (q_{i+1}^2 - q_i^2)/2 \quad (38)$$

For large $\beta$ both $s(x)$ and $y^2(x)$ are approximately equal to $Q^2(x)$, so the computation of the variance $s(x) - y^2(x)$ as the difference of these two nearly equal quantities will suffer from underflow. This problem is avoided, in some embodiments, by substituting the expressions for these quantities into the equation for the variance to explicitly cancel out the $Q^2(x)$ terms:

$$v_i(x) \equiv \text{Var}_\epsilon[Q(x + \epsilon)^2] \quad (39)$$

$$= s_i(x) - y_i^2(x) \quad (40)$$

$$= \begin{array}{l}(C_i - 2q_i A_i)\exp(\beta(x - x_{i+1})) + (D_i - 2q_i B_i)\exp(\beta(x_i - x)) \\ + A_i^2 \exp(2\beta(x - x_{i+1})) + B_i^2 \exp(2\beta(x_i - x)) \\ + 2A_i B_i \exp(\beta(x_i - x_{i+1}))\end{array} \quad (41)$$

Given the analytic form of both the mean $y(x)$ and variance $s(x) - y^2(x)$ random values from this distribution are sampled during training and used to learn the temperature of the noise, T. For example, given an input x in the interval $[x_i, x_{i+1}]$ a sample cane be generated:

$$y_{sample}(x) = y_i(x) + z\sqrt{v_i(x)} \quad (42)$$

where z is a z-score drawn from a standard normal distribution. Given the analytic expressions for $y_i(x)$ and $v(x)$ a reparameterization trick is used in some embodiments to compute derivatives with respect to network parameters including the temperature T.

In some embodiments, the modified quantization function is combined with variational information bottleneck (VIB) for generic activation noise. In other embodiments, VIB for different specific noise models are used. VIB penalizes the mutual information between the activation values of consecutive layers in the network. This mutual information between layers i-1 and i is estimated using a variational approximation, where the distribution of activation values in channel c of layer i is approximated by $q(\alpha) = N(\alpha; \mu=0, \sigma_c^2)$ a zero-mean normal distribution with variance $\sigma_c^2$. The actual distribution of a given activation value in this layer is described by $p(\alpha) = N(\alpha; \mu_\alpha, \sigma_\alpha^2)$. Note that the variance describes the noise of a specific activation due to noise introduced by VIB, and does not model the variation in activation values across the channel or for different network inputs.

Kullback-Leibler (KL) divergence between two normal distributions $p = N(\mu_p, \sigma_p^2)$ and $q = N(\mu_q, \sigma_q^2)$ is given by:

$$KL(p \| q) = \frac{1}{2}\left(\log\frac{\sigma_q^2}{\sigma_p^2} + \frac{\sigma_p^2 + (\mu_p - \mu_q)^2}{\sigma_q^2} - 1\right) \quad (43)$$

Here the mean of the approximating distribution, $\mu_q$, is zero by assumption. In VIB the KL divergence is computed for an individual activation value, averaged over all activations in the channel and all training inputs. The variational approximation is computed by analytically minimizing over $\sigma_q^2$. The value of $\sigma_q^2$ that minimizes the average of the KL over activations in the channel is:

$$\sigma_q^2 = \langle \sigma_\alpha^2 + \mu_\alpha^2 \rangle_c \quad (44)$$

In Equation (44), $\langle \; \rangle_c$ defines an average over the activations in channel c. The average KL for channel c is then:

$$\langle KL(a \| q) \rangle_c = \left\langle \log\left(1 + \frac{\langle \mu_a^2 \rangle_c}{\sigma_a^2}\right)\right\rangle_c \quad (45)$$

The VIB loss term is then this average KL weighted by a layer-specific hyperparameter. VIB loss terms for specific noise models below are discussed below.

Given that the differentiable quantization function produces continuous values, some embodiments take steps to ensure that training does not exploit this increased expressivity. One solution would be to require $T \to 0$ during the optimization. However, in this limit the gradient becomes a sequence of Dirac delta functions, making optimization difficult. In some embodiments, training is not effective for $T \lesssim 1/20$. An alternative is to add noise to the optimization function that is at least as large as the approximation error so that it cannot be exploited:

$$Q(x) \to \tilde{Q}(x) + \epsilon, \text{ where } \epsilon \sim N(0, \sigma^2) \quad (46)$$

The random noise is sampled once per activation, in some embodiments, during forward propagation. Some embodiments require that $\theta^2$ is larger than the typical value distortion, $\overline{D}(T)$, given above. With this approach the increased expressivity introduced by using a continuous approximation is removed. If T and $\sigma$ are hyperparameters some embodiments ensure $\sigma^2 \geq \overline{D}(T)$ when they are set. If they are learned parameters per channel (as discussed below) then this constraint is enforced using a Lagrangian. In some embodiments, a violation of this constraint can be resolved by increasing a or by decreasing T.

In this embodiment, normal-distributed noise is added to the quantized outputs. The noise has zero-mean and variance for activations in channel c. For this noise model, with additive noise with a for all activations in channel the VIB loss term is:

$$\langle KL(a \| q) \rangle_c = \log\left(1 + \frac{\langle \mu_a^2 \rangle_c}{\sigma_c^2}\right) \quad (47)$$

Some embodiments use Bayesian optimization and hyperband for the hyperparameter optimization, as described in "BOHB: Robust and Efficient Hyperparameter Optimization at Scale", by Falkner, et al., in Proceedings of the 35th International Conference on Machine Learning, July 2018, which is incorporated herein by reference. Some embodiments use a bilevel optimization approach, as described in "Self-Tuning Networks: Bilevel Optimization of Hyperparameters Using Structured Best-Response Functions", by MacKay, et al., available at https://arxiv.org/pdf/1903.03088.pdf, March 2019. Both of these papers are incorporated herein by reference.

In self-tuning networks, the learned parameters, including the learned variance, become linear functions of the hyperparameters. In VIB the log variance, $\log(\sigma_c^2)$, is worked with as the learned parameter because this value is allowed to range over the entire real line, and there is no need to clip parameters to keep them in the valid range. So, the linear response for the log variance can be parameterized as:

$$\log \text{var}_{lc} = \log \text{var}_{lc}^{(0)} + \Sigma_i \lambda_i \log \text{var}_{lci}^{(1)} \quad (48)$$

In Equation (48), the $\lambda_i$ are the hyperparameters, of which the VIB coefficients and the temperature T are of particular importance. In some embodiments, Bayesian optimization and hyperband is used in addition to self-tuning networks to learn hyperparameters that are not as easily learned using self-tuning networks. For example, Bayesian optimization and hyperband is used, in some embodiments, to learn a learning rate, optimization parameters, etc.

Some embodiments compute noise variance as the LogSumExp—a smooth approximation to max of 0 and the linear response in order to keep the variance positive instead of using the log variance. LogSumExp is used, in some embodiments, instead of the log variance to avoid having to exponentiate the log noise variance to get the real noise variance. When using the log noise variance, in some embodiments, hyperparameter samples far from the distribution mean, used to compute the linear response for the log noise variance, can yield exponentially large values of the noise variance. Some embodiments use functions that have small Lipschitz constants, where the exponential function is not globally Lipschitz. This leads to a noisy estimate for the gradient for the noise linear-response parameters. In some embodiments, a linear response for each channel is defined as:

$$r_{lc} = r_{lc}^{(0)} + \Sigma_i \lambda_i r_{lc}^{(1)} \quad (49)$$

The variance for each channel is computed, in some embodiments, as the LogSumExp of r and 0 as:

$$\sigma_{lc}^2 = s * \ln\left[1 + \exp\left(\frac{r_{lc}}{s}\right)\right] \quad (50)$$

Here s>0 is the LogSumExp smoothing parameter and the variance $\sigma^2$ is always positive. The derivative of the variance (Eq. 50) with respect to the linear response, r, is given by the standard logistic function with argument r/s:

$$\frac{d(\sigma^2)}{dr} = \frac{1}{1+e^{\frac{r}{s}}} = 1 - e^{\frac{\sigma^2}{s}} \quad (51)$$

The derivative therefore takes values in the interval (0,1), and $\sigma^2(r)$ has a Lipschitz constant of 1.

The asymptotic behavior of $\sigma^2(r)$ is given by:

$$\sigma^2 = \begin{cases} se^{r/s}, & \sigma^2 \ll s \\ r, & \sigma^2 \gg s \end{cases} \quad (52)$$

The asymptotic behavior of the derivative, $$\frac{d(\sigma^2)}{dr},$$

is given by:

$$\frac{d(\sigma^2)}{dr} = \begin{cases} e^{r/s} \approx \frac{\sigma^2}{s}, & \sigma^2 \ll s \\ 1, & \sigma^2 \gg s \end{cases} \quad (53)$$

If s is larger than the typical noise variance then the noise variance will still grow exponentially with the response. In some embodiments, assuming that $\sigma^2$ is the variance of multiplicative noise, the relevant scale of $\sigma^2$ is 1, the threshold above which a channel is pruned. So s should be set no larger than 1 and perhaps somewhat smaller, e.g., 0.1. On the other hand, if s is too small then there is a risk that a gradient step can take us from a reasonable value of $\sigma^2$ to a value where the derivative vanishes. This should not happen as long as s is set at least as large as the smallest value of the variance, $\sigma_{min}^2$, that is expected to be encountered (e.g., $\sigma_{min}^2 = 10^{-4}$). The training should function well for any value of the smoothing parameter, s, in the range to $10^{-4}$). to $10^{-1}$.

In some embodiments, the approximate quantization function results from adding Laplacian noise to the inputs and given input x, the quantized value is distributed as $N(\mu=y(x), \sigma^2=v(x))$. A pre-quantization VIB term is added, in some embodiments, that rewards increasing T for each channel to the point where the channel does not transmit any information. Given that the variance of the additive Laplacian noise is $2T^2$ some embodiments use the VIB term:

$$\langle KL(x+\epsilon \| q) \rangle_c \approx \log\left(1 + \frac{\langle x^2 \rangle_c}{2T^2}\right) \quad (54)$$

In Equation (54), $\langle \ \rangle_c$ is the mean-squared input. The post-quantization VIB term, in some embodiments, is given by:

$$\langle KL(\alpha \| q) \rangle_c = \log \langle s(x) \rangle_c - \langle \log v(x) \rangle_c \quad (55)$$

In the embodiment in which quantized activations are distributed as $N(\mu=y(x), \sigma^2=v(x))$, the uncertainty in the quantized values arising from additive Laplacian input noise with diversity T, the temperature is a learned parameter. In self-tuning networks, the inverse temperature for each channel becomes a linear function of the network hyperparameters. The inverse temperature for channel c in layer l is then:

$$\beta_{lc} = \beta_{lc}^{(0)} + \Sigma_i \lambda_i \beta_{lci}^{(1)} \quad (56)$$

In Equation (56), $\lambda_i$ is the $i^{th}$ hyperparameter and the set of hyperparameters includes the VIB coefficients. In some embodiments, the piecewise-constant function Q(x), not the approximation, y(x), is used during inference.

Figure 3:
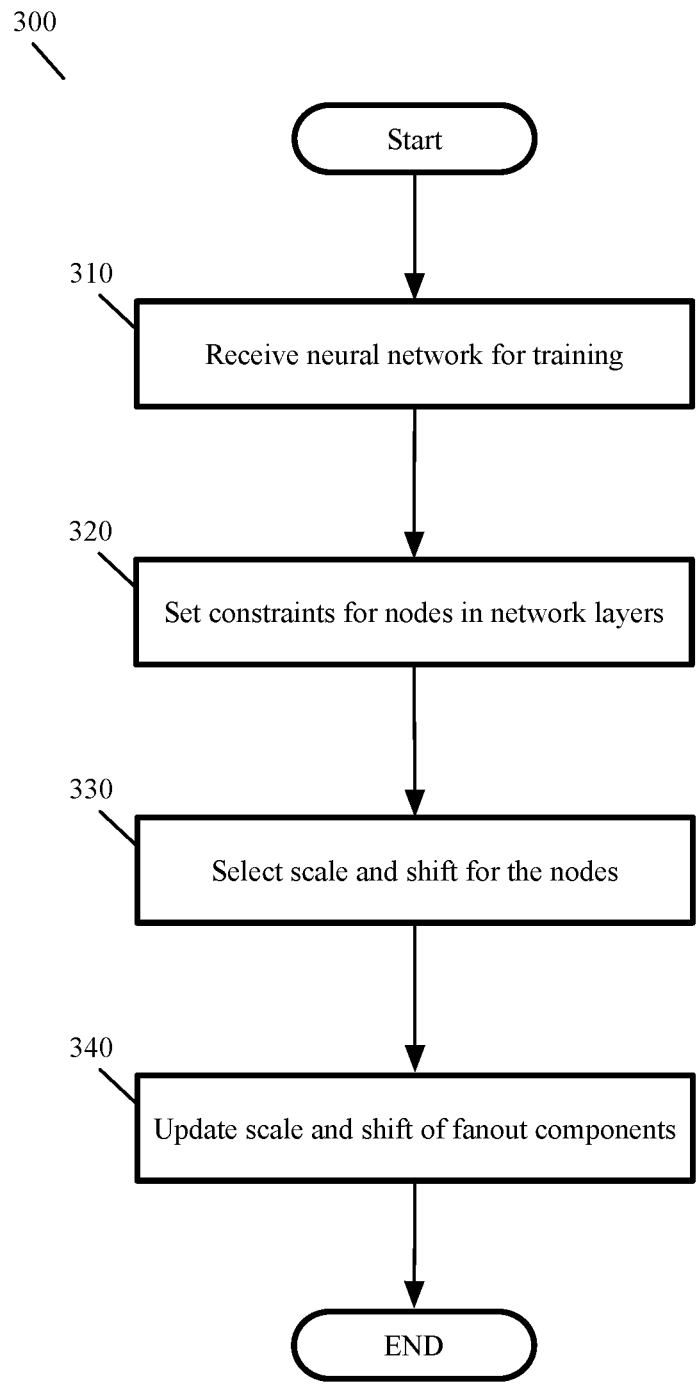
FIG. 3 conceptually illustrates a process 300 for performing a set of scaling operations.

FIG. 3 conceptually illustrates a process 300 for performing a set of scaling operations. In some embodiments, the process 300 is performed as part of the scaling operation 220 as described in relation to FIG. 2. The process 300 begins (at 310) by receiving a network to train. In some embodiments, the network is a pre-trained floating point neural network. In other embodiments, the network is a randomly-initialized floating point network. The received network in some embodiments includes multiple different types of layer nodes (e.g., convolution, fully connected, pool, elementwise addition or multiplications, concatenations, etc.).

After receiving (at 310) the network to train, a set of constraints is set (at 320) on fanin (e.g., input processing) components for each layer node. As described above in relation to FIG. 2, each concatenation fanin component is constrained to have no scale or shift, each elementwise multiplication is constrained to have no shift, and each elementwise addition fanin component is constrained to have a same affine transformation as a set of other elementwise addition fanin components. In some embodiments, fanin components operate on the inputs to a neural network node layer.

Once the constraints are set (at 320), a scale and shift are selected (at 330) for the nodes in the network layer. In some embodiments, the scale and shift are selected such that they are consistent with the constraints set at 320. Given a distribution of values to quantize (based on running a set of training sets through the received network), a scale and shift of the optimal quantization can be selected by alternately minimizing the sum of squared quantization errors over the scale, shift, and bin assignment. For elementwise operations, some embodiments select discrete scaling factors (1×, 3×, or 4×). In some embodiments, a scale and shift are selected for a set of related nodes such that the quantization error is minimized for all the nodes in the set of related nodes (e.g., by taking the union of the node distributions and minimizing the quantization error for the combined distribution). If using the same scale and shift for a set of related nodes results in poor value quantization for some nodes, some embodiments insert affine transformations into the network to break up the set of related nodes.

After a scale and shift are selected (at 330) for the nodes in the network layer, the representation for the scale and shift parameters and the scale and shift of the fanout components is updated (at 340). In some embodiments, the scale and shift of the fanout components is updated to cancel the scale and shift of the scale and shift values selected (at 330) for the fanin components of the layer nodes. After updating the fanout scale and shift parameters, the process ends. One of ordinary skill in the art will appreciate that this process may be performed at different points in the training of the network as it transitions from a floating point network to a quantized network.

Figure 4:
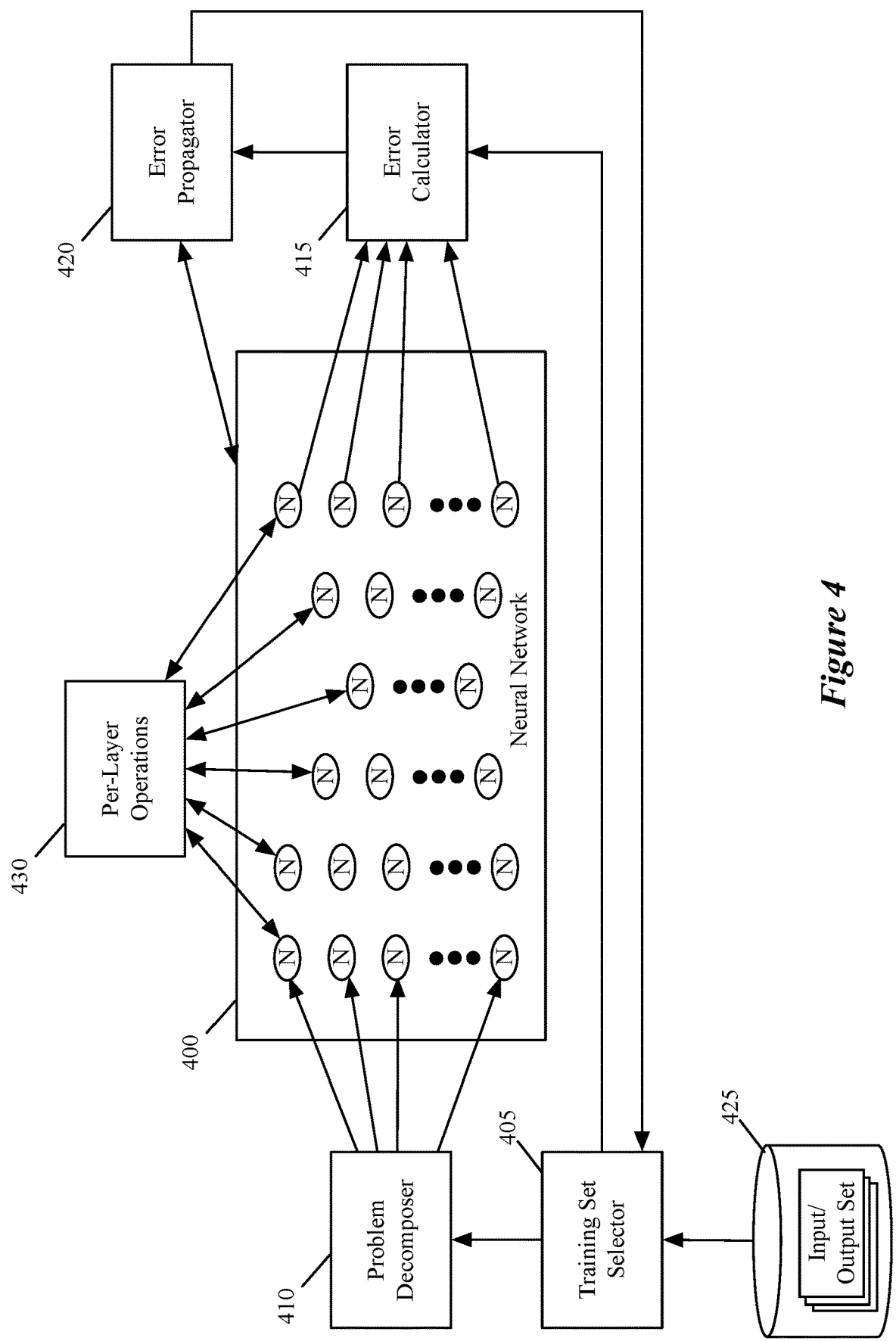
FIG. 4 illustrates a set of modules of some embodiments that perform a back propagation process that uses multiple known training sets to train the MT network.
Figure 5:
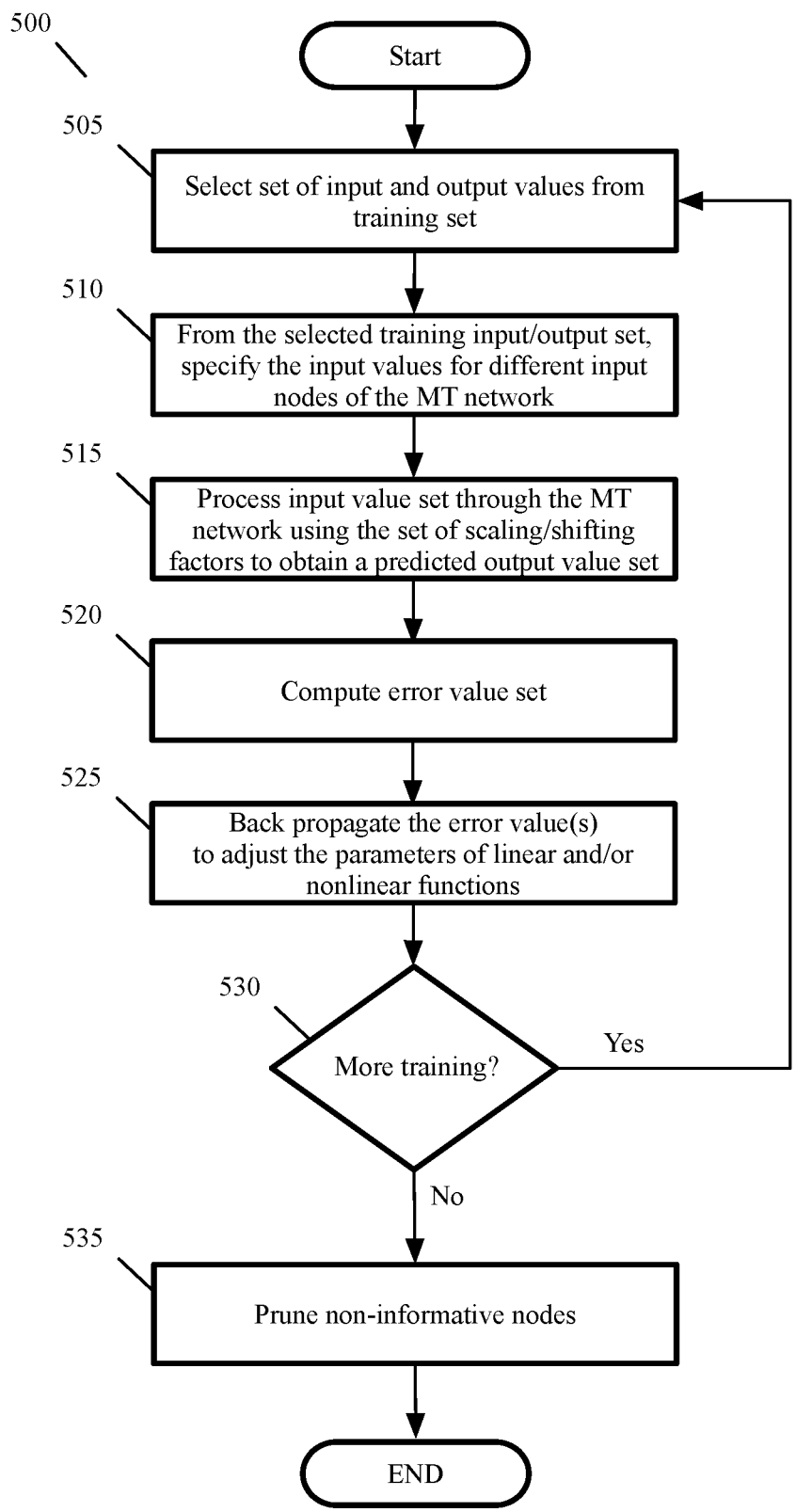
FIG. 5 illustrates the back-propagation process that the modules of FIG. 4 perform.

FIG. 4 illustrates a set of modules of some embodiments that perform a backpropagation process that uses multiple known training sets to train the MT network 400. As shown, these modules include a training set selector 405, an input selector 410, an error calculator 415, and an error propagator 420 and a set of per-layer operations 430 (e.g., scale and shift calculation, noise introduction, etc.). In some embodiments, all of these modules execute on one device, such as a mobile device (e.g., smartphone, tablet, etc.) or an IoT device. In other embodiments, these modules are performed on a different device than the device the eventually executes the MT network 400. FIG. 5 illustrates the back-propagation process 500 that the modules of FIG. 4 perform.

As described in FIG. 5, the training set selector 405 initially selects (at 505) a training set from the training sets that are stored in a data storage 425. In some embodiments, the data storage 425 is on the same device that executes the modules 405-420 of FIG. 4, while in other embodiments, this data storage is on a remote server. The selected training set includes a set of input values and a set of output values. The output value set is the set of output values that the MT network should generate for the input value set of the selected training set. In other words, the output value set is the known/desired output value set for the input value set. As described below, for each selected input value set, the training process typically (1) forward propagates the input value set through the network's nodes to produce a computed output value set and then (2) backpropagates a gradient (rate of change) of a loss function (output error) that quantifies in a particular way the difference between the input set's known output value set and the input set's computed output value set, in order to adjust the network's configurable parameters (e.g., the weight coefficients). The forward and backward propagation, in some embodiments, use the approximate quantization function and affine transformations to calculate the output and gradients as described above in relation to FIG. 3.

The input selector 410 selects (at 510) the inputs to the MT network's input nodes from the set of input values selected at 505. Next, the MT network 400 processes (at 515) the supplied input values to produce a set of output values. In some embodiments, this processing entails each processing node of the MT network first having its linear operator 110 compute a weighted sum of its inputs (including a scaling and shifting operation on the inputs [i.e., a fanin operation] in some embodiments), then having its nonlinear activation operator 115 compute a function based on the output of the linear component, and then, in some embodiments, having its output transformation component 140 perform a second set of scaling and shifting operations on the output of the nonlinear activation operator 115 (i.e., a fanout operation). In a first pass of a first training set, the fanin and fanout scaling and transformation parameters may be calculated by a scaling operation of the set of per-layer operations 430 as described in relation to scaling operation 220 of FIG. 2. Subsequent processing of inputs to produce outputs will include the calculated fanin and fanout parameters in the linear operator 110 and the output transformation component 140. The calculated parameters, in some embodiments, are updated in the training process. In some embodiments, the processing includes the addition of noise from the per-layer operations module 430. In some embodiments, the noise is introduced as a probabilistic noise such that each output of a node is actually a distribution of outputs as described above.

The error calculator 415 computes (at 520) a set of error values (i.e., a loss function) from (1) the output value set produced by the MT network for the supplied input value set, and (2) the output value set from the selected training set (selected at 505). As shown, the error calculator 415 receives the training set's output value(s) from the training set selector 405 in some embodiments. In the example illustrated in FIG. 4, the MT network 400 has multiple output processing nodes that each produce one output value. In other embodiments, the MT network produces a single value from one processing node.

For each output value in the output value set, the error calculator 415 computes (at 520) an error value by subtracting the MT-network produced output value from the desired output value. The error calculator 415 provides (at 525) the error value set that it computes to the error propagator 420, which then coordinates the back propagation of this error value set (i.e., the loss function) through the processing nodes of the MT network. With the loss function calculated, the error calculator 415 provides this loss function result to the error propagator 420, which backpropagates the loss function to determine the rate of change of the loss function with respect to a change of each weight value. In typical training, the loss function is backpropagated through the network in a process that determines, for each weight, the rate of change of the loss function with respect to a change in the weight at the current value of the loss function. The backpropagation process uses the chain rule for partial derivatives to isolate the partial derivative of the loss function with respect to each individual weight used in the multi-layer network, and assign a value to this partial derivative for the current value of the loss function. Thus, this process identifies the relative effect on the loss function of changes to the many different weights used to generate the outputs of the network. The backpropagation, in some embodiments, uses the approximate quantized activation function as described above in relation to FIG. 3.

In some embodiments, each processing node is an instantiated object that includes a back-propagation function for handling back-propagation calls from the error propagator 420. In these embodiments, each time the error propagator 420 calls a processing node's back-propagation function, this function computes adjustments to the parameter(s) of the node's linear operator and/or nonlinear operator and returns to the error propagator 420 error values to propagate back to each of the inputs of the node's linear operator. To call the propagating function of a particular processing node that is not an output processing node, the error propagator 420, in some embodiments, aggregates (e.g., sums) the error values that it has received from all processing nodes when more than one processing node receives the particular processing node's output, and then supplies the aggregated error value to the particular processing node's propagating function.

After the computed error value is back propagated through the processing nodes of the MT network and one or more of these nodes adjust their linear and/or nonlinear operator parameters during this back propagation, the error propagator 420 notifies the training set selector 405 that it has completed its error propagation. Next, the training set selector 405 determines (at 530) whether it should stop the training of the MT network. In some embodiments, the training set selector 405 uses a minimization process (e.g., a stochastic gradient descent minimizer) to determine when it should stop the training of the MT network. When the training set selector 405 determines that it should continue the training, the process 500 returns to 505 to select another training set from the storage 425, and then repeats operations 510-530 for this selected training set. As described above, in some embodiments, a new training set is generated instead of selected from a pre-generated set of training sets. In some embodiments, the process 500 can iterate multiple times through one training set (i.e., one input/output set), while this process is training the configurable parameters of the MT network 400.

When the training set selector 405 determines that it does not need to continue the training, process 500 performs a pruning operation (at 535) to remove non-informative nodes (e.g., nodes that are so sensitive that their signal is drowned out by noise) as described above in relation to FIGS. 2 and 3. The pruning operation, in some embodiments, is performed by a pruning module not shown in FIG. 4. A threshold based on a scaling factor and a computed variance of the values produced at each node due to the addition of noise is used in some embodiments to determine non-informative nodes. In some embodiments, the pruning is based on VIB methods as described above in relation to FIGS. 2 and 3. After performing the pruning operation (at 535), the process 500 ends.

After training the multi-layer network, in some embodiments, a set of program instructions is generated for executing the quantized neural network on a neural network inference circuit that uses a particular set of quantization values for executing the set of program instructions for the quantized neural network.

Figure 6:
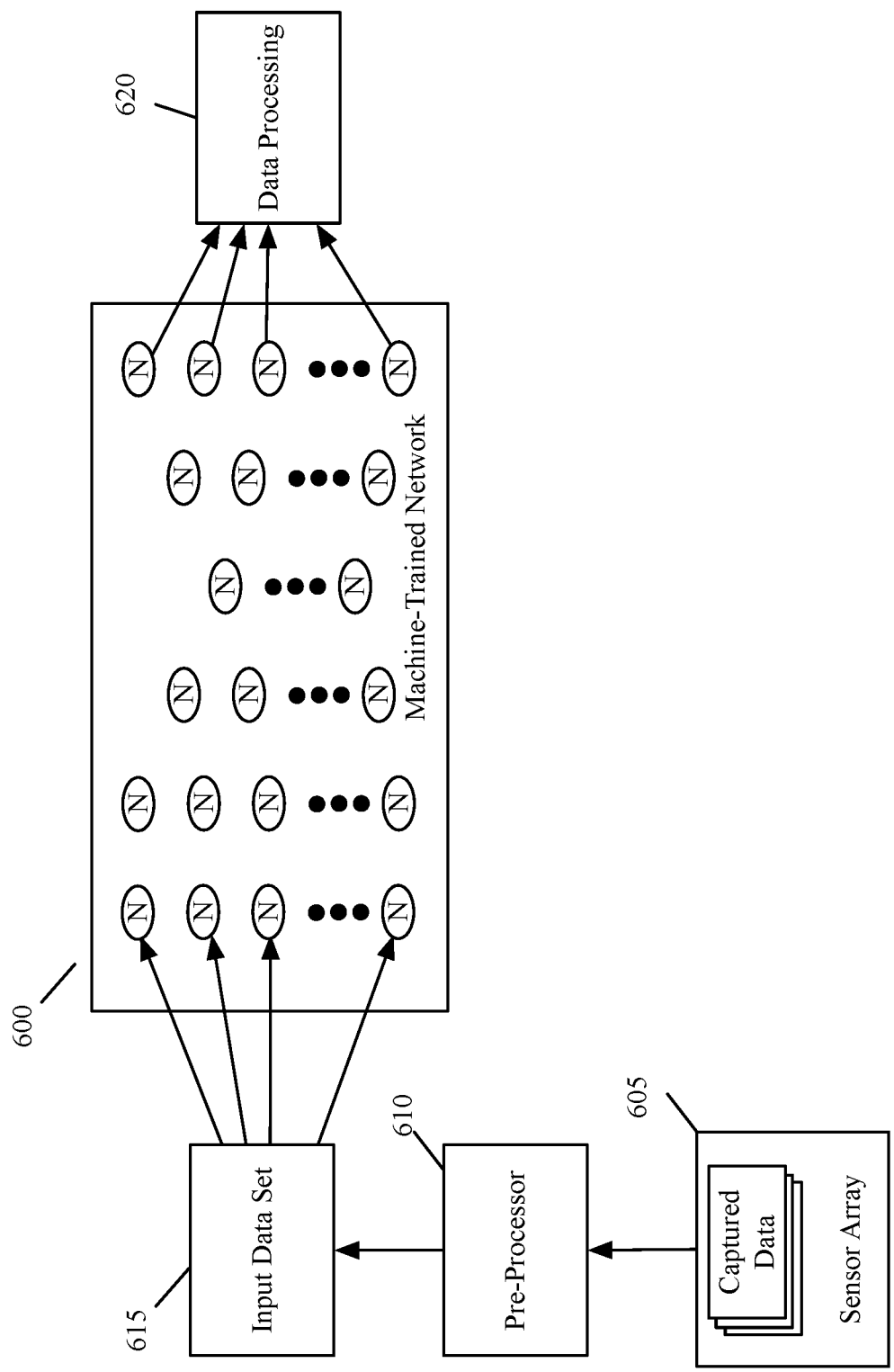
FIG. 6 illustrates a system using a machine-trained network to compute an output value set from data captured by a sensor array.

FIG. 6 illustrates a system using a machine-trained network to compute an output value set from data captured by a set of sensors. FIG. 6 includes MT network 600, a sensor array 605, a pre-processor 610, an input data set 615 and a data processing unit 620. Sensor array 605 captures data that is passed to pre-processor 610. Pre-processor 610 takes the raw data set and converts it into a form that is acceptable to MT network 600 (e.g., by cropping raw image data to be of a certain size). Once input data set 615 is in the proper format, it is fed to MT network 600 as input data and MT network 600 processes the input data set to produce the output value set. The output value set is then passed to data processing module 620.

Figure 7:
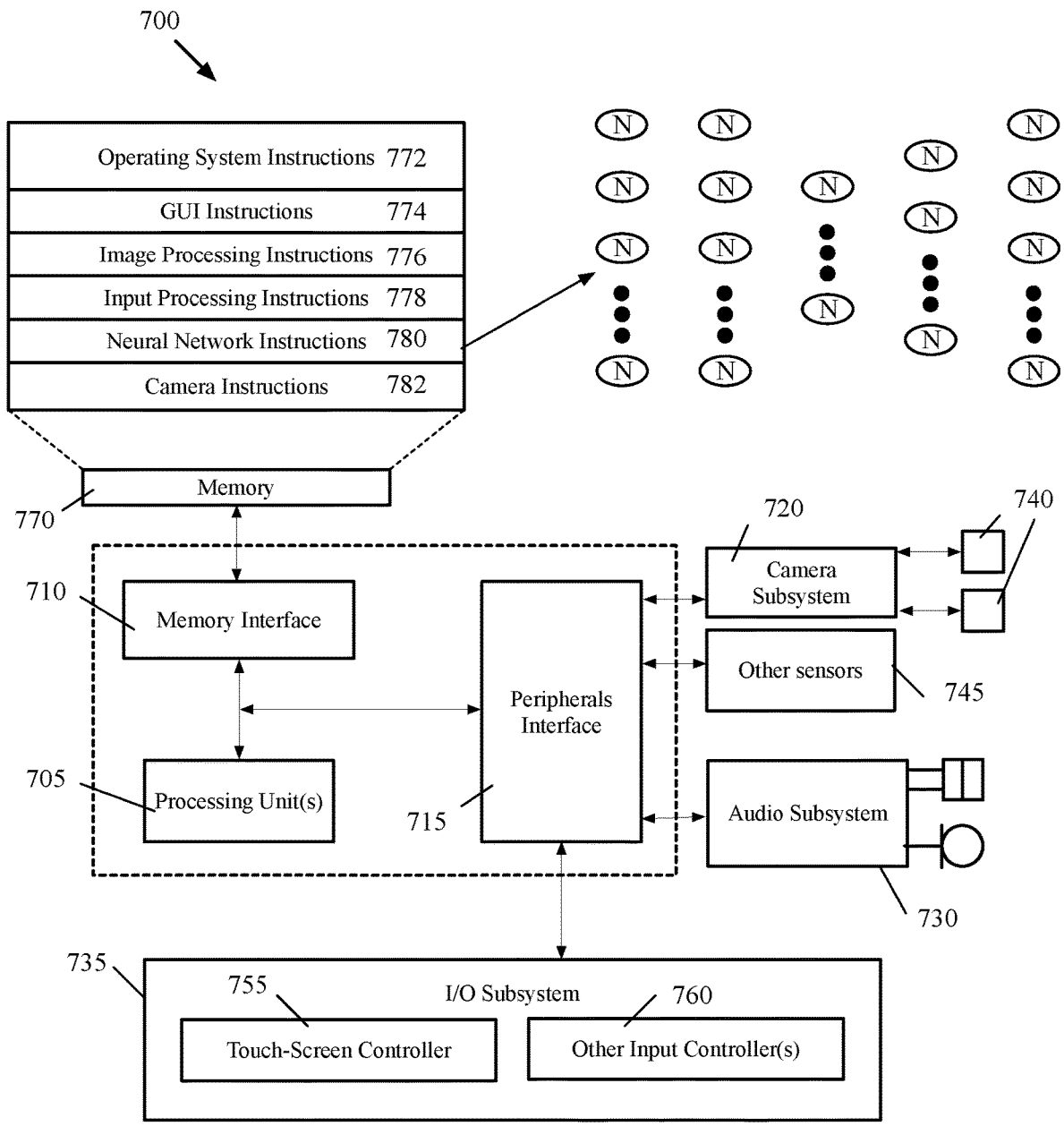
FIG. 7 illustrates an example of an architecture of a mobile computing device that stores neural network processing instructions, and multiple sub-networks that can be loaded into the processor for different purposes.

FIG. 7 is an example of an architecture 700 of a mobile computing device that stores neural network processing instructions, and multiple sub-networks that can be loaded into the processor for different purposes. Examples of mobile computing devices include smartphones, tablets, laptops, etc. As shown, the mobile computing device 700 includes one or more processing units 705, a memory interface 710 and a peripherals interface 715.

The peripherals interface 715 is coupled to various sensors and subsystems, including a camera subsystem 720, an audio subsystem 730, an I/O subsystem 735, and other sensors 745 (e.g., motion sensors), etc. The peripherals interface 715 enables communication between the processing units 705 and various peripherals. For example, an orientation sensor (e.g., a gyroscope) and an acceleration sensor (e.g., an accelerometer) can be coupled to the peripherals interface 715 to facilitate orientation and acceleration functions. The camera subsystem 720 is coupled to one or more optical sensors 740 (e.g., a charged coupled device (CCD) optical sensor, a complementary metal-oxide-semiconductor (CMOS) optical sensor, etc.). The camera subsystem 720 and the optical sensors 740 facilitate camera functions, such as image and/or video data capturing.

The audio subsystem 730 couples with a speaker to output audio (e.g., to output voice navigation instructions). Additionally, the audio subsystem 730 is coupled to a microphone to facilitate voice-enabled functions, such as voice recognition (e.g., for searching), digital recording, etc. The I/O subsystem 735 involves the transfer between input/output peripheral devices, such as a display, a touch screen, etc., and the data bus of the processing units 705 through the peripherals interface 715. The I/O subsystem 735 includes a touch-screen controller 755 and other input controllers 760 to facilitate the transfer between input/output peripheral devices and the data bus of the processing units 705. The touch-screen controller couples with a touch screen (not shown) to detect contact and movement on the touch screen using any of multiple touch sensitivity technologies. The other input controllers 760 are coupled to other input/control devices, such as one or more buttons.

In some embodiments, the device includes wireless communication subsystem (not shown in FIG. 7) to establish wireless communication functions. In some embodiments, the wireless communication subsystem includes radio frequency receivers and transmitters, and/or optical receivers and transmitters. These receivers and transmitters of some embodiments are implemented to operate over one or more communication networks such as a GSM network, a Wi-Fi network, a Bluetooth network, etc.

The memory interface 710 is coupled to memory 770. In some embodiments, the memory 770 includes volatile memory (e.g., high-speed random access memory), non-volatile memory (e.g., flash memory), a combination of volatile and non-volatile memory, and/or any other type of memory. As illustrated in FIG. 7, the memory 770 stores an operating system (OS) 772. The OS 772 includes instructions for handling basic system services and for performing hardware dependent tasks.

The memory 770 also stores various sets of instructions, including (1) graphical user interface instructions 774 to facilitate graphic user interface processing; (2) image processing instructions 776 to facilitate image-related processing and functions; (3) input processing instructions 778 to facilitate input-related (e.g., touch input) processes and functions; and (4) camera instructions 782 to facilitate camera-related processes and functions. The processing units 710 execute the instructions stored in the memory 770 in some embodiments.

In addition, the memory 770 stores neural network instructions 780, for implementing the machine-trained network of some embodiments of the invention. The memory also stores a set of weight values for an audio-processing network and a set of weight values for an image-processing network in some embodiments.

The memory 770 further stores communication instructions to facilitate communicating with one or more additional devices. The instructions described above are merely exemplary and the memory 770 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits. The memory 770 may represent multiple different storages available on the device 700.

While the components illustrated in FIG. 7 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 7 may be split into two or more integrated circuits.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
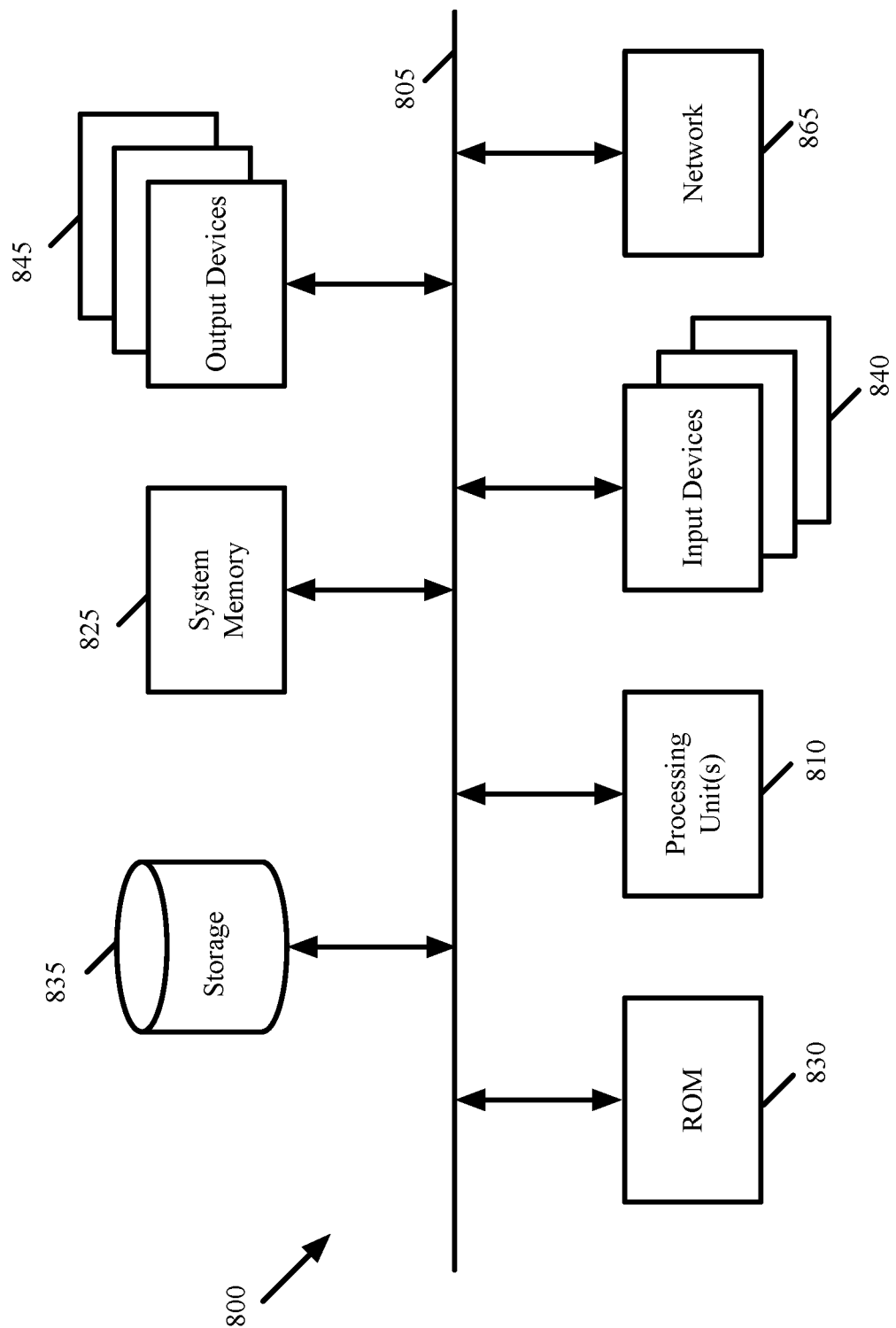
FIG. 8 conceptually illustrates an electronic system with which some embodiments of the invention are implemented.

FIG. 8 conceptually illustrates an electronic system 800 with which some embodiments of the invention are implemented. The electronic system 800 can be used to execute any of the control, virtualization, or operating system applications described above. The electronic system 800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieves instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such a random access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieves instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for transforming a neural network that uses floating point values into a neural network that uses values quantized to a particular range, the method comprising:
   receiving a definition of a floating-point neural network comprising a plurality of parameters at a plurality of layers;
   for each layer of a set of the layers:
      determining a distribution of values for input values of the layer;
      based on the determined distribution, selecting a first set of scaling and shift values for application to input values of the layer; and
      based on the selected first set of scaling and shift values, selecting a second set of scaling and shift values to apply to outputs of the layer;
   training the floating-point neural network to be a quantized neural network using the selected first and second sets of scaling and shift values for each layer of the set of layers, said training comprising:
      propagating sets of input values through the neural network while applying the first and second sets of scaling and shift values at each layer of the neural network to generate sets of output values; and
      backpropagating loss calculated based on the sets of output values to modify the plurality of parameters of the neural network; and
   generating program instructions for a neural network inference circuit to execute the quantized and trained neural network, the neural network inference circuit using a particular set of quantization values for executing the quantized and trained neural network based on the generated program instructions.

2. The method of claim 1 further comprising determining a set of constraints on the first set of scaling and shift values for each layer, wherein the set of constraints for each layer is based on a type of computation that the layer performs, wherein the first set of scaling and shift values for the layer are selected based on the set of constraints for the layer.

3. The method of claim 2, wherein a particular layer performs element-wise addition and the set of constraints for the particular layer comprises a constraint that the input values of the layer must be scaled by a same scaling value.

4. The method of claim 2, wherein a particular layer performs element-wise multiplication and the set of constraints for the particular layer comprises a constraint that the shift value of the particular layer must be zero.

5. The method of claim 2, wherein a particular layer performs concatenation and the set of constraints for the particular layer comprises a constraint that all input values must share a same first set of scaling and shift values.

6. The method of claim 1, wherein training the floating point neural network to be a quantized neural network produces a neural network that uses values quantized to a particular range for execution by the neural network inference circuit.

7. The method of claim 6, wherein the quantized values are one of 8-bit and 4-bit values.

8. The method of claim 1, wherein the floating point values used by the neural network are stored using a variable position of a binary point used to represent the floating point value.

9. The method of claim 8, wherein the values quantized to a particular range use a fixed binary point position.

10. The method of claim 1, wherein:
   the plurality of parameters of the floating-point neural network comprises a set of weights associated with each layer;
   the set of weights and a set of output values of each layer of the floating-point neural network are floating-point values; and
   training the floating-point neural network to be a quantized neural network comprises constraining the set of weights to a set of ternary values comprising −1, 0, and 1 and constraining the set of output values of each layer to a set of quantized values using a number of bits less than used by a floating point value and using a fixed binary point position.

11. A method for transforming a recurrent neural network that uses floating point values into a recurrent neural network that uses values quantized to a particular range, the method comprising:
   receiving a definition of a floating-point recurrent neural network comprising a plurality of parameters at a plurality of layers;
   for each layer of a set of the layers:
      determining a distribution of values for input values of the layer; and
      based on the determined distribution, selecting a set of scaling and shift values for application to input values of the layer;
   training the floating-point recurrent neural network to be a quantized recurrent neural network using the selected sets of scaling and shift values, wherein all time steps use a same set of scaling and shift values, said training comprising:

propagating sets of input values through the recurrent neural network while applying the first and second sets of scaling and shift values at each layer of the recurrent neural network to generate sets of output values; and backpropagating loss calculated based on the sets of output values to modify the plurality of parameters of the recurrent neural network; and generating program instructions for a neural network inference circuit to execute the quantized and trained recurrent neural network, the neural network inference circuit using a particular set of quantization values for executing the quantized recurrent neural network based on the generated program instructions.

12. The method of claim 11, wherein:

for each layer of the set of layers, the selected set of scaling and shift values are a first set of scaling and shift values applied to the input values of the layer;

the method further comprises, for each layer of the set of layers, based on the selected first set of scaling and shift values for the layer, selecting a second set of scaling and shift values to apply to output values of the layer; and training the floating-point recurrent network to be a quantized recurrent neural network comprises using the first and second selected sets of scaling and shift values for each layer of the set of layers.

13. The method of claim 12, wherein the second set of scaling and shift values for each layer is selected to cancel an effect of the first set of scaling and shift values on the output values of the layer.

14. A non-transitory machine readable medium storing a program which when executed by a set of processing units transforms a neural network that uses floating point values into a neural network that uses values quantized to a particular range, the program comprising sets of instructions for:

receiving a definition of a floating-point neural network comprising a plurality of parameters at a plurality of layers;

for each layer of a set of the layers:

determining a distribution of values for input values of the layer;

based on the determined distribution, selecting a first set of scaling and shift values for application to input values of the layer; and based on the selected first set of scaling and shift values, selecting a second set of scaling and shift values to apply to outputs of the layer;

training the floating-point neural network to be a quantized neural network using the selected first and second sets of scaling and shift values for each layer of the set of layers, said training comprising:

propagating sets of input values through the neural network while applying the first and second sets of scaling and shift values at each layer of the neural network to generate sets of output values; and backpropagating loss calculated based on the sets of output values to modify the plurality of parameters of the neural network; and generating program instructions for a neural network inference circuit to execute the quantized and trained neural network, the neural network inference circuit using a particular set of quantization values for executing the quantized neural network based on the generated program instructions.

15. The non-transitory machine readable medium of claim 14, the program further comprising a set of instructions for determining a set of constraints on the first set of scaling and shift values for each layer, wherein the set of constraints for each layer is based on a type of computation that the layer performs, wherein the first set of scaling and shift values for the layer are selected based on the set of constraints for the layer.

16. The non-transitory machine readable medium of claim 14, wherein the second set of scaling and shift values for each layer is selected to cancel an effect of the first set of scaling and shift values on the output values of the layer.

17. The non-transitory machine readable medium of claim 14, wherein the floating-point neural network is a recurrent neural network and all time steps use a same set of scaling and shift values.

18. The non-transitory machine readable medium of claim 14, wherein training the floating point neural network to be a quantized neural network produces a neural network that uses values quantized to a particular range for execution by the neural network inference circuit.

19. The non-transitory machine readable medium of claim 14, wherein:

the plurality of parameters of the floating-point neural network comprises a set of weights associated with each layer;

the set of weights and a set of output values of each layer of the floating-point neural network are floating-point values; and the set of instructions for training the floating-point neural network to be a quantized neural network comprises a set of instructions for constraining the set of weights to a set of ternary values comprising −1, 0, and 1 and constraining the set of output values of each layer to a set of quantized values using a number of bits less than used by a floating point value and using a fixed binary point position.

20. The non-transitory machine readable medium of claim 18, wherein the quantized values are one of 8-bit and 4-bit values.

* * * * *